(12) United States Patent
Niedermeier et al.

(10) Patent No.: US 10,607,630 B2
(45) Date of Patent: Mar. 31, 2020

(54) ENCODING BY RECONSTRUCTING PHASE INFORMATION USING A STRUCTURE TENSOR ON AUDIO SPECTROGRAMS

(71) Applicant: Fraunhofer-Gesellschaft zur Förderung der angewandten Forschung e.V., München (DE)

(72) Inventors: Andreas Niedermeier, München (DE); Richard Füg, Nürnberg (DE); Sascha Disch, Fürth (DE)

(73) Assignee: FRAUNHOFER-GESELLSCHAFT ZUR FÖRDERUNG DER, München (DE)

( * ) Notice: Subject to any disclaimer, the term of this patent is extended or adjusted under 35 U.S.C. 154(b) by 0 days.

(21) Appl. No.: 16/133,840

(22) Filed: Sep. 18, 2018

(65) Prior Publication Data
US 2019/0019529 A1    Jan. 17, 2019

Related U.S. Application Data

(63) Continuation of application No. PCT/EP2017/056263, filed on Mar. 16, 2017.

(30) Foreign Application Priority Data

Mar. 18, 2016   (EP) .................................. 16161230

(51) Int. Cl.
*G10L 25/18* (2013.01)
*G06F 16/683* (2019.01)
(Continued)

(52) U.S. Cl.
CPC ............ *G10L 25/18* (2013.01); *G06F 16/683* (2019.01); *H04R 3/04* (2013.01); *H04S 7/307* (2013.01);
(Continued)

(58) Field of Classification Search
CPC ............ G10L 19/00; G10L 21/00; G10H 1/00
(Continued)

(56) References Cited

U.S. PATENT DOCUMENTS

| | | |
|---|---|---|
| 2011/0058685 A1 | 3/2011 | Sagayama et al. |
| 2011/0106529 A1 | 5/2011 | Disch |

(Continued)

FOREIGN PATENT DOCUMENTS

| | | |
|---|---|---|
| AU | 2013 203 159 | 5/2013 |
| AU | 2013/203159 B2 | 5/2013 |

(Continued)

OTHER PUBLICATIONS

Magron Paul et al: "Phase reconstruction of spectrograms with linear unwrapping: Application to audio signal restoration", 2015 23rd European Signal Processing Conference (EUSIPCO), EURASIP, Aug. 31, 2015 (Aug. 31, 2015), pp. 1-5, XP032836338, DOI: 10.1109/EUSIPC0.2015.7362333 [retrieved on Dec. 22, 2015] cited in.*

(Continued)

*Primary Examiner* — Melur Ramakrishnaiah
(74) *Attorney, Agent, or Firm* — McClure, Qualey & Rodack, LLP

(57) ABSTRACT

An apparatus for phase reconstruction from a magnitude spectrogram of an audio signal is provided. The apparatus includes a frequency change determiner being configured to determine a change of a frequency for each time-frequency bin of a plurality of time-frequency bins of the magnitude spectrogram of the audio signal depending on the magnitude spectrogram of the audio signal, and a phase reconstructor being configured to generate phase values for the plurality of time-frequency bins depending on the changes of the frequencies determined for the plurality of the time-frequency bins.

21 Claims, 10 Drawing Sheets

(51) Int. Cl.
    H04S 7/00      (2006.01)
    H04R 3/04      (2006.01)
    G10L 21/0272   (2013.01)
(52) U.S. Cl.
    CPC . *G10H 2210/031* (2013.01); *G10H 2210/041* (2013.01); *G10H 2210/056* (2013.01); *G10H 2210/076* (2013.01); *G10H 2240/011* (2013.01); *G10H 2240/066* (2013.01); *G10H 2240/071* (2013.01); *G10H 2250/235* (2013.01); *G10L 21/0272* (2013.01); *H04S 2400/15* (2013.01); *H04S 2420/03* (2013.01); *H04S 2420/07* (2013.01)
(58) Field of Classification Search
    USPC ................ 381/97, 98, 105; 700/94; 704/500
    See application file for complete search history.

(56) References Cited

U.S. PATENT DOCUMENTS

| | | | |
|---|---|---|---|
| 2011/0288873 A1* | 11/2011 | Nagel | G10L 19/265 704/500 |
| 2012/0051549 A1 | 3/2012 | Nagel et al. | |
| 2015/0286459 A1 | 10/2015 | Habets et al. | |
| 2019/0147898 A1 | 5/2019 | Davis | |

FOREIGN PATENT DOCUMENTS

| | | |
|---|---|---|
| JP | S62502572 A | 10/1987 |
| JP | 2007526522 A | 9/2007 |
| JP | 2009210888 A | 9/2009 |
| JP | 2013057895 A | 3/2013 |
| JP | 2013197815 A | 9/2013 |
| JP | 2016506664 A | 3/2016 |
| RU | 2 487 426 C2 | 3/2012 |
| RU | 2 543 309 C2 | 3/2013 |
| WO | 8605617 A | 9/1986 |
| WO | 2015/157013 A1 | 10/2015 |

OTHER PUBLICATIONS

Chang-Chun Bao et al: "A blind bandwidth extension method for audio signals based on phase space reconstruction", EURASIP Journal on Audio Speech and Music Processing, vol. 2014, No. 1, Dec. 1, 2014 (Dec. 1, 2014), XP055381022, US ISSN: 1687-4714, DOI: 10.1186/1687-4722-2014-1.*
Aggelos Gkiokas, Vassilios Katsouros, George Carayannis, and Themos Stafylakis, "Music tempo estimation and beat tracking by applying source separation and metrical relations", in Proceedings of the IEEE International Conference on Acoustics, Speech, and Signal Processing (ICASSP), 2012, pp. 421-424.
Bernhard Lehner, Gerhard Widmer, and Reinhard Sonnleitner, "On the reduction of false positives in singing voice detection", in Proceedings of the IEEE International Conference on Acoustics, Speech, and Signal Processing (ICASSP), Florence, Italy, 2014, pp. 7480-7484.
Yushi Ueda, Yuuki Uchiyama, Takuya Nishimoto, Nobutaka Ono, and Shigeki Sagayama, "HMM-based approach for automatic chord detection using refined acoustic features", in Proceedings of the IEEE International Conference on Acoustics, Speech, and Signal Processing (ICASSP), Dallas, Texas, USA, 2010, pp. 5518-5521.
Nobutaka Ono, Kenichi Miyamoto, Hirokazu Kameoka, and Shigeki Sagayama, "A real-time equalizer of harmonic and percussive components in music signals", in Proceedings of the International Society for Music Information Retrieval Conference (ISMIR), Philadelphia, Pennsylvania, USA, 2008, pp. 139-144.
Nobutaka Ono, Kenichi Miyamoto, Jonathan LeRoux, Hirokazu Kameoka, and Shigeki Sagayama, "Separation of a monaural audio signal into harmonic/percussive components by complementary diffusion on spectrogram", in European Signal Processing Conference, Lausanne, Switzerland, 2008, pp. 240-244.
Derry Fitzgerald, "Harmonic/percussive separation using median filtering", in Proceedings of the International Conference on Digital Audio Effects (DAFX), Graz, Austria, 2010, pp. 246-253.
Scott N. Levine and Julius O. Smith III, "A sines+transients+noise audio representation for data compression and time/pitch scale modications", in Proceedings of the AES Convention, 1998.
Tony S. Verma and Teresa H.Y. Meng, "An analysis/synthesis tool for transient signals that allows a flexible sines+transients+noise model for audio", in Proceedings of the IEEE International Conference on Acoustics, Speech, and Signal Processing (ICASSP), Seattle, Washington, USA, May 1998, pp. 3573-3576.
Laurent Daudet, "Sparse and structured decompositions of signals with the molecular matching pursuit", IEEE Transactions on Audio, Speech, and Language Processing, vol. 14, No. 5, pp. 1808-1816, Sep. 2006.
Jonathan Driedger, Meinard Müller, and Sascha Disch, "Extending harmonic-percussive separation of audio signals", in Proceedings of the International Conference on Music Information Retrieval (ISMIR), Taipei, Taiwan, 2014, pp. 611-616.
Jeongsoo Park and Kyogu Lee, "Harmonic-percussive source separation using harmonicity and sparsity constraints", in Proceedings of the International Conference on Music Information Retrieval (ISMIR), Málaga, Spain, 2015, pp. 148-154.
Josef Bigun and Gösta H. Granlund, "Optimal orientation detection of linear symmetry", in Proceedings of the IEEE First International Conference on Computer Vision, London, UK, 1987, pp. 433-438.
Hans Knutsson, "Representing local structure using tensors", in 6th Scandinavian Conference on Image Analysis, Oulu, Finland, 1989, pp. 244-251.
Chris Harris and Mike Stephens, "A combined corner and edge detector", in Proceedings of the 4th Alvey Vision Conference, Manchester, UK, 1988, pp. 147-151.
Rolf Bardeli, "Similarity search in animal sound databases", IEEE Transactions on Multimedia, vol. 11, No. 1, pp. 68-76, Jan. 2009.
Matthias Zeppelzauer, Angela S. Stöger, and Christian Breiteneder, "Acoustic detection of elephant presence in noisy environments", in Proceedings of the 2nd ACM International Workshop on Multimedia Analysis for Ecological Data, Barcelona, Spain, 2013, pp4. 3-8.
Hanno Scharr, "Optimale Operatoren in der digitalen Bildverarbeitung", Dissertation, IWR, Fakultät für Physik und Astronomie, Universität Heidelberg, Heidelberg, Germany, 2000.
Emmanuel Vincent, Rémi Gribonval, and Cédric Févotte, "Performance measurement in blind audio source separation", IEEE Transactions on Audio, Speech, and Language Processing, vol. 14, No. 4, pp. 1462-1469, 2006.
Daniel W. Griffin and Jae S. Lim, "Signal estimation from modified short-time Fourier transform", IEEE Transactions on Acoustics, Speech, and Signal Processing, vol. 32, No. 2, pp. 236-243, 1984.
Byung-Jun Yoon and Henrique S Malvar, "Coding overcomplete representations of audio using the mclt", in Data Compression Conference, 2008. DCC 2008. IEEE, 2008, pp. 152-161.
Magron Paul et al: "Phase reconstruction of spectrograms with linear unwrapping: Application to audio signal restoration", 2015 23rd European Signal Processing Conference (EUSIPCO). EURASIP, Aug. 31, 2015 (Aug. 31, 2015), pp. 1-5, XP032836338.
Chang-Chun Bao et al: "A blind bandwidth extension method for audio signals based on phase space reconstruction", EURASIP Journal on Audio Speech and Music Processing, vol. 2014, No. I, Dec. 1, 2014 (Dec. 1, 2014), XP055381022.
International Search Report issued in PCT/EP2017/056263 dated Jun. 26, 2017.
Russian Office Action dated Jun. 3, 2019, issued in application No. RU 2018136578/08(060566).
Magron, P., et al.; "Phase reconstruction of spectrograms with linear unwrapping: Application to audio signal restoration;" 2015 23rd European Signal Processing Conference (EUSIPCO), EURASIP; Aug. 2015; pp. 1-5.
Japanese Office Action dated Jan. 9, 2020, issued in application No. JP 2018-549178.

(56) References Cited

OTHER PUBLICATIONS

English language translation of Japanese Office Action dated Jan. 9, 2020, issued in application No. JP 2018-549178.

* cited by examiner

ENCODING BY RECONSTRUCTING PHASE INFORMATION USING A STRUCTURE TENSOR ON AUDIO SPECTROGRAMS

CROSS-REFERENCE TO RELATED APPLICATION

This application is a continuation of copending International Application No. PCT/EP2017/056263, filed Mar. 16, 2017, which is incorporated herein by reference in its entirety, and additionally claims priority from European Application No. EP 16 161 230.4, filed Mar. 18, 2016, which is incorporated herein by reference in its entirety.

BACKGROUND OF THE INVENTION

The present invention relates to audio signal processing, and, in particular, to an apparatus and method for harmonic-percussive-residual sound separation using the structure tensor on spectrograms.

Being able to separate a sound into its harmonic and percussive component is an effective preprocessing step for many applications.

While "Harmonic-Percussive(-Residual) Separation" is a common term, it is misleading as it implies a harmonic structure with sinusoidals having a frequency of an integer multiple of the fundamental frequency. Even though the correct term should be "Tonal-Percussive-(Residual) Separation", the term and "harmonic" instead of "tonal" Is used in the following for easier understanding.

Using the separated percussive component of a music recording for example can lead to a quality improvement for beat tracking (see [1]), rhythm analysis and transcription of rhythm instruments. The separated harmonic component is suitable for the transcription of pitched instruments and chord detection (see [3]). Furthermore, harmonic-percussive separation can be used for remixing purposes like changing the level ratio between both signal components (see [4]), which leads to an either "smoother" or "punchier" overall sound perception.

Some methods for harmonic-percussive sound separation rely on the assumption that harmonic sounds have a horizontal structure in the magnitude spectrogram of the input signal (in time direction), while percussive sounds appear as vertical structures (in frequency direction). Ono et al. presented a method that first creates harmonically/percussively enhanced spectrograms by diffusion in time/frequency direction (see [5]). By comparing these enhanced representations afterwards, a decision if a sound is either harmonic or percussive could be derived.

A similar method was published by Fitzgerald, where the enhanced spectrograms were calculated by using median filtering in perpendicular directions instead of diffusion (see [6]), which led to similar results while reducing the computational complexity.

Inspired by the sines+transients+noise (S+T+N) signal model (see [7], [8], [9]), a framework that aims to describe the respective signal components by means of a small set of parameters. Fitzgerald's method was then extended to harmonic-percussive-residual (HPR) separation in [10]. As audio signals often consist of sounds that are neither clearly harmonic nor percussive, this procedure captures these sounds in a third, residual component. While some of these residual signals clearly have an isotropic, neither horizontal nor vertical, structure (as for example noise), there exist sounds that do not have a clear horizontal structure but nevertheless carry tonal information and may be perceived as harmonic part of a sound. An example are frequency modulated tones like they can occur in recordings of violin playing or vocals, where they are said to have "vibrato". Due to the strategy of recognizing either horizontal or vertical structures, the aforementioned methods are not always able to capture such sounds in their harmonic component.

A harmonic-percussive separation procedure based on non-negative matrix factorization that is capable of capturing harmonic sounds with non-horizontal spectral structures in the harmonic component was proposed in [11]. However it did not include a third residual component.

Summarizing the above, recent methods rely on the observation that in a spectrogram representation, harmonic sounds lead to horizontal structures and percussive sounds lead to vertical structures. Furthermore, these methods associate structures that are neither horizontal nor vertical (i.e., non-harmonic, non-percussive sounds) with a residual category. However, this assumption does not hold for signals like frequency modulated tones that show fluctuating spectral structures, while nevertheless carrying tonal information.

The structure tensor, a tool used in image processing (see [12], [13]), is applied there to grey scale images for edge and corner detection (see [14]) or to estimate the orientation of an object. The structure tensor has already been used for preprocessing and feature extraction in audio processing (see [15], [16]).

SUMMARY

According to an embodiment, an apparatus for phase reconstruction from a magnitude spectrogram of an audio signal may have: a frequency change determiner being configured to determine a change of a frequency for each time-frequency bin of a plurality of time-frequency bins of the magnitude spectrogram of the audio signal depending on the magnitude spectrogram of the audio signal, and a phase reconstructor being configured to generate phase values for the plurality of time-frequency bins depending on the changes of the frequencies determined for the plurality of the time-frequency bins.

According to another embodiment, a system may have: an encoder for encoding a magnitude spectrogram of an audio signal, and a decoder being an inventive apparatus, for decoding the audio signal, wherein the decoder is configured to determine a change of a frequency for each time-frequency bin of a plurality of time-frequency bins of the magnitude spectrogram of the audio signal depending on the magnitude spectrogram of the audio signal, wherein the decoder is configured to generate phase values for the plurality of time-frequency bins depending on the changes of the frequencies determined for the plurality of the time-frequency bins, and wherein the decoder is configured to decode the audio signal using the magnitude spectrogram of the audio signal and using the phase values for the plurality of time-frequency bins.

According to another embodiment, an encoder may be configured to generate a magnitude spectrogram of an audio signal for the inventive apparatus for phase reconstruction.

According to another embodiment, a method for phase reconstruction from a magnitude spectrogram of an audio signal may have the steps of: determining a change of a frequency for each time-frequency bin of a plurality of time-frequency bins of the magnitude spectrogram of the audio signal depending on the magnitude spectrogram of the audio signal, and generating phase values for the plurality of time-frequency bins depending on the changes of the frequencies determined for the plurality of the time-frequency bins.

Another embodiment may have a non-transitory digital storage medium having a computer program stored thereon to perform the method for phase reconstruction from a magnitude spectrogram of an audio signal, the method having the steps of: determining a change of a frequency for each time-frequency bin of a plurality of time-frequency bins of the magnitude spectrogram of the audio signal depending on the magnitude spectrogram of the audio signal, and generating phase values for the plurality of time-frequency bins depending on the changes of the frequencies determined for the plurality of the time-frequency bins, when said computer program is run by a computer.

An apparatus for phase reconstruction from a magnitude spectrogram of an audio signal is provided. The apparatus comprises a frequency change determiner being configured to determine a change of a frequency for each time-frequency bin of a plurality of time-frequency bins of the magnitude spectrogram of the audio signal depending on the magnitude spectrogram of the audio signal, and a phase reconstructor being configured to generate phase values for the plurality of time-frequency bins depending on the changes of the frequencies determined for the plurality of the time-frequency bins.

Moreover, an encoder being configured to generate a magnitude spectrogram of an audio signal for the apparatus for phase reconstruction as described above is provided.

Moreover, a method for phase reconstruction from a magnitude spectrogram of an audio signal is provided. The method comprises:

Determining a change of a frequency for each time-frequency bin of a plurality of time-frequency bins of the magnitude spectrogram of the audio signal depending on the magnitude spectrogram of the audio signal. And:

Generating phase values for the plurality of time-frequency bins depending on the changes of the frequencies determined for the plurality of the time-frequency bins.

Furthermore, a computer program is provided, wherein the computer program is configured to implement the above-described method when being executed on a computer or signal processor.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
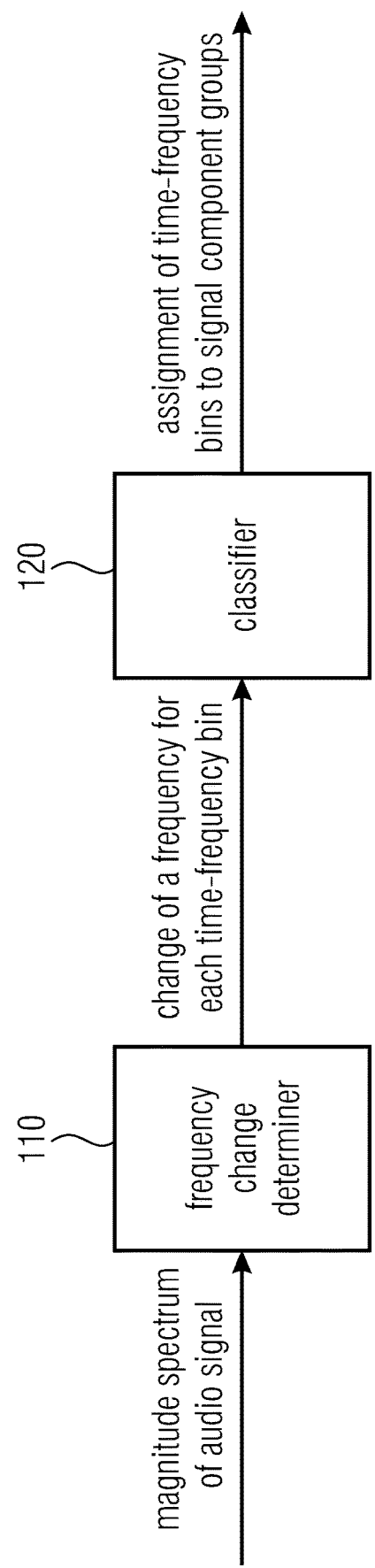
FIG. 1 illustrates an apparatus for analysing a magnitude spectrogram of an audio signal according to an embodiment.

FIG. 1 illustrates an apparatus for analysing a magnitude spectrogram of an audio signal according to embodiments.

The apparatus comprises a frequency change determiner 110. The frequency change determiner 110 is configured to determine a change of a frequency for each time-frequency bin of a plurality of time-frequency bins of the magnitude spectrogram of the audio signal depending on the magnitude spectrogram of the audio signal.

Moreover, the apparatus comprises a classifier 120. The classifier 120 is configured to assign each time-frequency bin of the plurality of time-frequency bins to a signal component group of two or more signal component groups depending on the change of the frequency determined for said time-frequency bin.

According to an embodiment, the frequency change determiner 110 may, e.g., be configured to determine the change of the frequency for each time-frequency bin of the plurality of time-frequency bins depending on an angle α(b, k) for said time-frequency bin. The angle α(b, k) for said time-frequency bin depends on the magnitude spectrogram of the audio signal.

In an embodiment, the frequency change determiner 110 may, e.g., be configured to determine the change of the frequency for each time-frequency bin of the plurality of time-frequency bins further depending on a sampling frequency $f_s$ of the audio signal, and depending on a length N of an analysis window and depending on a hop size H of the analysis window.

According to an embodiment, the apparatus frequency change determiner 110 is configured to determine the change of the frequency for each time-frequency bin of the plurality of time-frequency bins depending on the formula $$R(b, k) = \frac{f_s^2}{HN} \cdot \tan(\alpha(b, k))$$

(b, k) indicates a time-frequency bin of the plurality of time-frequency bins, wherein R(b, k) indicates the change of the frequency for said time-frequency bin (b, k), wherein b indicates time, wherein k indicates frequency, wherein $f_s$ indicates the sampling frequency of the audio signal, wherein N indicates the length of the analysis window, wherein H indicates the hop size of the analysis window, and wherein α(b, k) indicates the angle for said time-frequency bin (b, k), wherein the angle α(b, k) depends on the magnitude spectrogram.

In an embodiment, the frequency change determiner 110 may, e.g., be configured to determine a partial derivative $S_b$ of the magnitude spectrogram S of the audio signal with respect to a time index. In such an embodiment, the frequency change determiner 110 may, e.g., be configured to determine a partial derivative $S_k$ of the magnitude spectrogram S of the audio signal with respect to a time index.

Moreover, in such an embodiment, the frequency change determiner 110 is configured to determine a structure tensor T(b, k) for each time-frequency bin (b, k) of the plurality of time-frequency bins depending on the partial derivative $S_b$ of the magnitude spectrogram S of the audio signal with respect to the time index and depending on the partial derivative $S_k$ of the magnitude spectrogram S of the audio signal with respect to the frequency index.

Furthermore, in such an embodiment, the frequency change determiner 110 may, e.g., be configured to determine the angle α(b, k) for each time-frequency bin (b, k) of the plurality of time-frequency bins depending the structure tensor T(b, k) for said time-frequency bin (b, k).

According to an embodiment, the frequency change determiner 110 may, e.g., be configured to determine the angle α(b, k) for each time-frequency bin (b, k) of the plurality of time-frequency bins by determining two components of $v_1(b, k)$ and $v_2(b, k)$ an eigenvector v(b, k) of the structure tensor (T(b, k)) of said time-frequency bin (b, k), and by determining the angle (α(b, k)) for said time-frequency bin ((b, k)) according to $$\alpha(b, k) = \operatorname{atan}\left(\frac{v_2(b, k)}{v_1(b, k)}\right) \in [-\pi/2; \pi/2].$$

α(b, k) indicates the angle for said time-frequency bin ((b, k)), wherein b indicates time, wherein k indicates frequency, and wherein atan( ) indicates an inverse tangent function.

In an embodiment, the classifier 120 may, e.g., be configured to determine a measure of anisotropy for each time-frequency bin (b, k) of the plurality of time-frequency bins depending on at least one of the formulae:

$$\left(\frac{\mu(b, k) - \lambda(b, k)}{\mu(b, k) + \lambda(b, k)}\right)^2$$

and $$\mu(b, k) + \lambda(b, k) \geq e,$$

μ(b, k) is a first eigenvalue λ(b, k) is a second eigenvalue of the structure tensor (T(b, k)) of said time-frequency bin (b, k), and $e \in \mathbb{R}^{>0}$.

In such an embodiment, the classifier 120 may, e.g., be configured to assign each time-frequency bin of the plurality of time-frequency bins to a signal component group of two or more signal component groups further depending on the change of the measure of anisotropy.

According to an embodiment, the classifier 120 may, e.g., be configured to determine the measure of anisotropy for said time-frequency bin (b, k) depending on the formula:

$$C(b, k) = \begin{cases} \left(\frac{\mu(b, k) - \lambda(b, k)}{\mu(b, k) + \lambda(b, k)}\right)^2 & , \mu(b, k) + \lambda(b, k) \geq e \\ 0 & , \text{else} \end{cases}$$

C(b, k) is the measure of anisotropy depending for said time-frequency bin (b, k), and wherein the classifier 120 is configured to assign said time-frequency bin (b, k) to a residual component group of the two or more signal component groups, if the measure of anisotropy C(b, k) is smaller than a first threshold value c, or wherein the classifier 120 is configured to assign said time-frequency bin (b, k) to the residual component group of the two or more signal component groups, if the measure of anisotropy C(b, k) is smaller than or equal to the first threshold c, wherein $c \in \mathbb{R}^{>0}$.

In an embodiment, the classifier 120 may, e.g., be configured to assign each time-frequency bin of the plurality of time-frequency bins to a signal component group of two or more signal component groups depending on the change R(b, k) of the frequency determined for said time-frequency bin (b, k), so that the classifier 120 assigns a time-frequency bin of the plurality of time-frequency bins to a harmonic signal component group of the two or more signal component groups depending on whether an absolute value |R(b, k)| of the change R(b, k) of the frequency determined for said time-frequency bin (b, k) is smaller than a second threshold $r_h$, or depending on whether the absolute value |R(b, k)| of the change R(b, k) of the frequency determined for said time-frequency bin (b, k) is smaller than or equal to the second threshold $r_h$, wherein $r_h \in \mathbb{R}^{>0}$.

According to an embodiment, the classifier 120 may, e.g., be configured to assign each time-frequency bin of the plurality of time-frequency bins to a signal component group of two or more signal component groups depending on the change R(b, k) of the frequency determined for said time-frequency bin (b, k), so that the classifier 120 assigns a time-frequency bin of the plurality of time-frequency bins to a percussive signal component group of the two or more signal component groups depending on whether the absolute value |R(b, k)| of the change R(b, k) of the frequency determined for said time-frequency bin (b, k) is greater than a third threshold $r_p$, or depending on whether the absolute value |R(b, k)| of the change (R(b, k)) of the frequency determined for said time-frequency bin (b, k) is greater than or equal to the third threshold $r_p$, wherein $r_p \in \mathbb{R}^{>0}$.

In the following, a detailed description of embodiments is provided.

Embodiments provide improved concepts for Harmonic-percussive-residual (HPR) sound separation based on the structure tensor. Some embodiments capture frequency modulated sounds that hold tonal information in the harmonic component by exploiting the information about the orientation of spectral structures provided by the structure tensor.

Some embodiments are based on the finding that a strict classification into horizontal and vertical is inappropriate for these signals and might lead to leakage of tonal information into the residual component. Embodiments relate to a novel method that instead uses the structure tensor, a mathematical tool, to calculate predominant orientation angles in the magnitude spectrogram. Embodiments employ this orientation information to distinguish between harmonic, percussive, and residual signal components, even in the case of frequency modulated signals. Finally, the effectiveness of the concept of embodiments is verified by means of both objective evaluation measures as well as audio examples.

Moreover, some embodiments are based on the finding that the structure tensor can be considered a black box, where the input is a gray scale image and the outputs are angles n for each pixel corresponding to the direction of lowest change and a certainty or anisotropy measure for this direction for each pixel. The structure tensor additionally offers the possibility to be smoothed, which reduces the influence of noise for enhanced robustness. Furthermore the certainty measure can be used to determine the quality of the estimated angles. A low value of this certainty measure indicates that the pixel lays in a region of constant brightness without any clear direction.

A local frequency change may, e.g., be extracted from the angles obtained by the structure tensor. Form these angles, it can be determined, whether a time-frequency-bin in the spectrogram belongs to the harmonic (=low local frequency change) or the percussive (=high or infinite local frequency change) component.

Improved embodiments for Harmonic-Percussive-Residual Classification And Separation are provided.

Harmonic-percussive-residual sound separation is a useful preprocessing tool for applications such as pitched instrument transcription or rhythm extraction. Instead of searching only for strictly horizontal and vertical structures, some embodiments determine predominant orientation angles as well as the local anisotropy in the spectrogram by using the structure tensor known from image processing.

Figure 2:
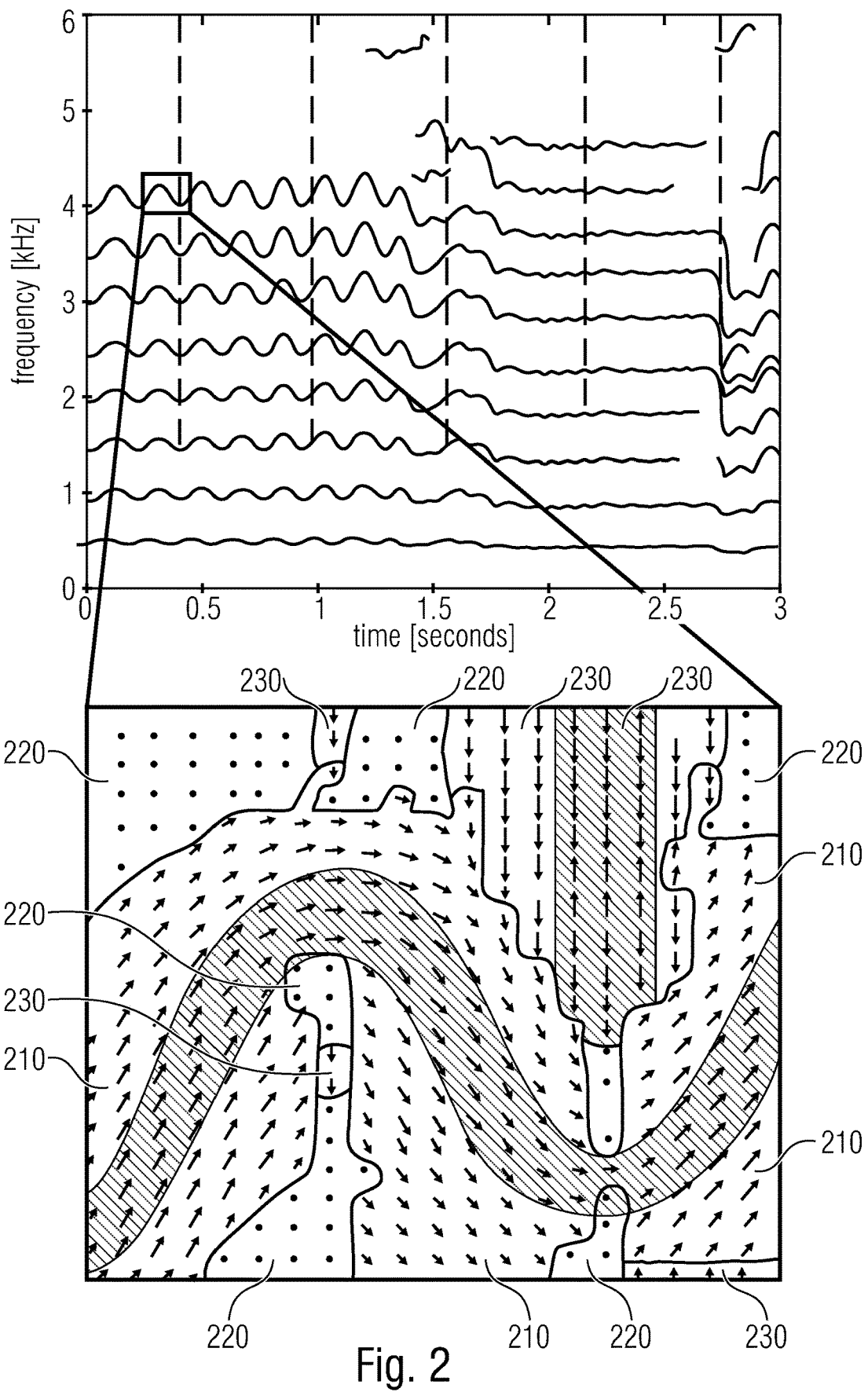
FIG. 2 illustrates a spectrogram of a mixture of a singing voice, castanets, and applause with zoomed in region according to an embodiment, wherein the orientation of the arrows indicates direction and wherein the length of the arrows indicates an anisotropy measure.

In embodiments, the provided information about the orientation of spectral structures can then be used to distinguish between harmonic, percussive, and residual signal components by setting appropriate thresholds, see FIG. 2.

FIG. 2 illustrates a spectrogram of a mixture of a singing voice, castanets, and applause with zoomed in region additionally showing direction (orientation of arrows) and anisotropy measure (length of arrows) obtained by the structure tensor. The color of the arrows indicate whether the respective time-frequency bin is assigned to the harmonic component (areas 210), to the percussive component (areas 230), or to the residual component (areas 220) based on the orientation and anisotropy information.

All bins having neither a high nor a low local frequency change rate or a certainty measure that indicates a constant region were assigned to belong to the residual component. An example for this separation of a spectrogram can be seen in FIG. 2. Embodiments perform better for audio signals comprising frequency modulated sounds than similar methods working on the magnitude spectrogram.

At first, a concept of structure tensor is described and this general concept is extended to be applicable in the context of audio processing.

In the following, matrices and vectors are written as bold letters for notational convenience. Furthermore, the (•) operator is used to index a specific element. In this case the matrix or vector is written as a non-bold letter to show its scalar use.

At first, calculation of a spectrogram according to embodiments is described. The audio signal may, e.g., be a (discrete) input audio signal.

The structure tensor may be applied to the spectrogram representation of a discrete input audio signal $x \in \mathbb{R}^M$ with a sampling frequency of $f_s$. For the spectral analysis of x, the short-time Fourier-transform TFT)

$$X(b,k) := \sum_{n=0}^{N-1} w(n)x(n+Hb)\exp(-i2\pi nk/N) \quad (1)$$

is used, where $X(b,k) \in \mathbb{C}$, b denotes the frame index, k the frequency index and $w \in \mathbb{R}^N$ is a window function of length N (in other words: N is a length of an analysis window). $H \in \mathbb{N}$, $H \leq N$ represents the analysis hop size of the window. It should be noted that since the STFT spectrum has a certain symmetry around the Nyquist point at $$\frac{N}{2},$$

the processing may, for example, be restricted to $$0 \leq k \leq \frac{N}{2},$$

as the symmetry can be reconstructed during the inverse STFT.

By using the above formula (1), a spectrogram can be obtained. A spectrogram comprises a plurality of spectra, wherein the plurality of spectra succeed each other in time. A second spectrum of the plurality spectra succeeds a first spectrum in time, if at least some second time domain samples exist that are used to generate the second spectrum and that are not used to generate the first spectrum, and that are time domain samples that refer to a later point-in-time than first time domain samples that are used to generate the first spectrum. Windows of time domain samples used for generating timely neighbored spectra may, for example, overlap.

In embodiments, the analysis window length N may, e.g., be defined to be:

256 samples≤N≤2048 samples.

In some embodiments, the analysis window length may, e.g., be 2048. In other embodiments, the analysis window length may, e.g., be 1024 samples. In further embodiments, the analysis window length may, e.g., be 768 samples. In still further embodiments, the analysis window length may, e.g., be 256 samples.

In embodiments, the analysis hop size H may, e.g., be in a range between 25% and 75% of the analysis window. In such embodiments:

0.25≤N≤H≤0.75 N.

Thus, in such embodiments, if the analysis window has, e.g., 2048 samples (N=2048), the analysis hop size may, e.g., be in the range:

512 samples≤H≤1536 samples.

If the analysis window has, e.g., 256 samples (N=256), the analysis hop size may, e.g., be in the range:

64 samples≤H≤192 samples.

In embodiments, the analysis hop size may, e.g., be 50% of the analysis window. This corresponds to a window overlap of two subsequent analysis windows of 50%.

In some embodiments, the analysis hop size may, e.g., be 25% of the analysis window. This corresponds to a window overlap of two subsequent analysis windows of 75%.

In other embodiments, the analysis hop size may, e.g., be 75% of the analysis window. This corresponds to a window overlap of two subsequent analysis windows of 25%.

It should be noted that the concepts of the present invention are applicable for any kind of time domain to spectral domain transformation, such as for the MDCT (Modified Discrete Cosine Transform), MDST (Modified Discrete Sine Transform, DSTFT (Discrete Short-Time Fourier Transform), etc.

The real valued logarithmic spectrogram may, e.g., be calculated as:

$$S(b,k)=20\log_{10}|X(b,k)| \quad (2)$$

The magnitude spectrogram of the audio signal may be referred to as S and a value of the magnitude spectrogram for a time-frequency bin (b, k) may be referred to as S(b, k).

In the following, calculation of the structure tensor according to embodiments is described.

For the calculation of the structure tensor the partial derivatives of S are needed. The partial derivative with respect to time index b is given by $$S_b = S * d \tag{3}$$

while the partial derivative with respect to frequency index k is defined as $$S_k = S * d^T \tag{4}$$

where d is a discrete differentiation operator (for example, for central differences one could choose d=[−1, 0, 1]/2) and * denotes the 2-dimensional convolution.

Furthermore, it may be defined:

$$T_{11} = (S_b \odot S_b) * G \tag{5}$$

$$T_{21} = T_{12} = (S_k \odot S_b) * G \tag{6}$$

$$T_{22} = (S_k \odot S_k) * G \tag{7}$$

where $\odot$ is the point wise matrix multiplication, also known as the Hadamard product and G is a 2-D Gaussian smoothing filter having the standard deviation $\sigma_b$ in time index direction and $\sigma_k$ in frequency index direction. The structure tensor T(b, k) is then given by a 2×2 symmetric and positive semidefinite matrix $$T(b, k) = \begin{bmatrix} T_{11}(b, k) & T_{12}(b, k) \\ T_{21}(b, k) & T_{22}(b, k) \end{bmatrix} \tag{8}$$

The structure tensor comprises information about the dominant orientation of the spectrogram at position (b, k). It should be noted that in the special case where G is a scalar, T(b, k) does not comprise more information than the gradient at this position in the spectrogram. However in contrast to the gradient, the structure tensor can be smoothed by G without cancellation effects, which makes it more robust against noise.

It should be noted, that a structure tensor T(b, k) is defined for each time-frequency bin (b, k) of the plurality of time-frequency bins. So when a plurality of time frequency bins is considered, e.g., the time-frequency bins (0, 0); (0, 1); (0, 2); ... (1, 0); (1, 1); (1, 2); ... then there exist a plurality of structure tensors T(0, 0); T(0, 1); T(0, 2); ... T(1, 0); T(1, 1); T(1, 2); .... For example, for each time-frequency bin (b, k) of the plurality of time-frequency bins, one structure tensor T(b, k) is determined.

In the following, calculation of angles and an anisotropy measure according to embodiments is described.

The information about the orientation for each bin in the spectrogram is obtained by calculating the eigenvalues $\lambda(b, k)$, $\mu(b, k)$ with $\lambda(b, k) \leq \mu(b, k)$ and the corresponding eigenvectors $v(b, k) = [v_1(b, k), v_2(b, k)]^T$ and $w(b, k) = [w_1(b, k), w_2(b, k)]^T$ of the structure tensor T(b, k). It should be noted that v(b, k), the eigenvector corresponding to the smaller eigenvalue $\lambda(b, k)$, is pointing into the direction of lowest change in the spectrogram at index (b, k), while w(b, k) is pointing in to the direction of highest change.

Thus, the angle of the orientation at a specific bin can be obtained by $$\alpha(b, k) = \operatorname{atan}\left(\frac{v_2(b, k)}{v_1(b, k)}\right) \in [-\pi/2; \pi/2] \tag{9}$$

$v_1(b, k)$ and $v_2(b, k)$ are the components of the eigenvector v (b, k).

atan( ) indicates an inverse tangent function.

In addition, a measure of anisotropy $$C(b, k) = \begin{cases} \left(\frac{\mu(b, k) - \lambda(b, k)}{\mu(b, k) + \lambda(b, k)}\right)^2, & \mu(b, k) + \lambda(b, k) \geq e \\ 0, & \text{else} \end{cases} \tag{10}$$

with $e \in \mathbb{R}^{>0}$ can be determined for each bin. It should be noted that $C(b, k) \in [0;1]$. Values of C(b, k) close to 1 indicate a high anisotropy of the spectrogram at index (b, k), while a constant neighborhood leads to values close to 0. The threshold e, that defines a limit on what should be considered anisotropic, can be chosen to further increase the robustness against noise.

The physical meaning of angle $\alpha(b, k)$ can be understood by considering a continuous signal with a change of instantaneous frequency $\Delta f$ during a time interval $\Delta t$. Thus the instantaneous frequency change rate R is denoted by $$R = \frac{\Delta f}{\Delta t} \tag{11}$$

For example, according to embodiments, the angles (indicated by the direction of the arrows in FIG. 2) obtained by the structure tensor may, e.g., be translated into a local frequency change rate $$R = \frac{\Delta f}{\Delta t} [\text{Hz/s}] \tag{11a}$$

for each time-frequency-bin of the spectrogram.

The change of the frequency for each time-frequency bin may, e.g., be referred to as instantaneous frequency change rate.

Considering sample rate, length and hop-size of the applied STFT analysis, a relation between the angles in the spectrogram and the instantaneous frequency change rate R(b, k) for each bin can be derived by $$R(b, k) = \frac{f_s^2}{HN} \cdot \tan(\alpha(b, k)) \tag{12}$$

Also the standard deviations of the smoothing filter G in the discrete domain $\sigma_b$ and $\sigma_k$ can be converted to the continuous physical parameters $\sigma_t$ and $\sigma_f$ by $$\sigma_t = \frac{H}{f_s} \sigma_b, \quad \sigma_f = \frac{f_s}{N} \sigma_k \tag{13}$$

In the following harmonic-percussive-residual separation using the structural tensor is described.

The information obtained via the structure tensor can be applied to the problem of HPR separation, e.g., to classify each bin in the spectrogram as being part of either the harmonic, the percussive or the residual component of the input signal.

Embodiments are based on the finding that bins assigned to the harmonic components should belong to rather horizontal structures, while bins belonging to rather vertical structures should be assigned to the percussive component. Furthermore, bins that do not belong to any kind of oriented structure should be assigned to the residual component.

According to embodiments, a bin (b, k) may, e.g., be assigned to the harmonic component, if it satisfies the first of the following two constraints.

According to embodiments, a bin (b, k) may, e.g., be assigned to the harmonic component, if it satisfies both of the following two constraints:

The first constraint may, e.g., be that the absolute value of the angle α(b, k) is smaller than (or equal to) a threshold $α_h$. The threshold $α_h$ may, e.g., be in the range $α_h \in [0; π/2]$. This means, that the bin should be part of some spectral structure that does not have a slope bigger or smaller than $α_h$. This way also frequency modulated sounds can be considered to be part of the harmonic component, depending on the parameter $α_h$.

The second constraint may, e.g., be that the measure of anisotropy C(b, k) supports that the bin (b, k) is part of some directed, anisotropic structure, and therefore exceeds a further threshold c. It should be noted that for a given bin (b, k), the angle α(b, k) and the measure of anisotropy C(b, k) together define a point in $\mathbb{R}^2$ given in polar coordinates.

Figure 3:
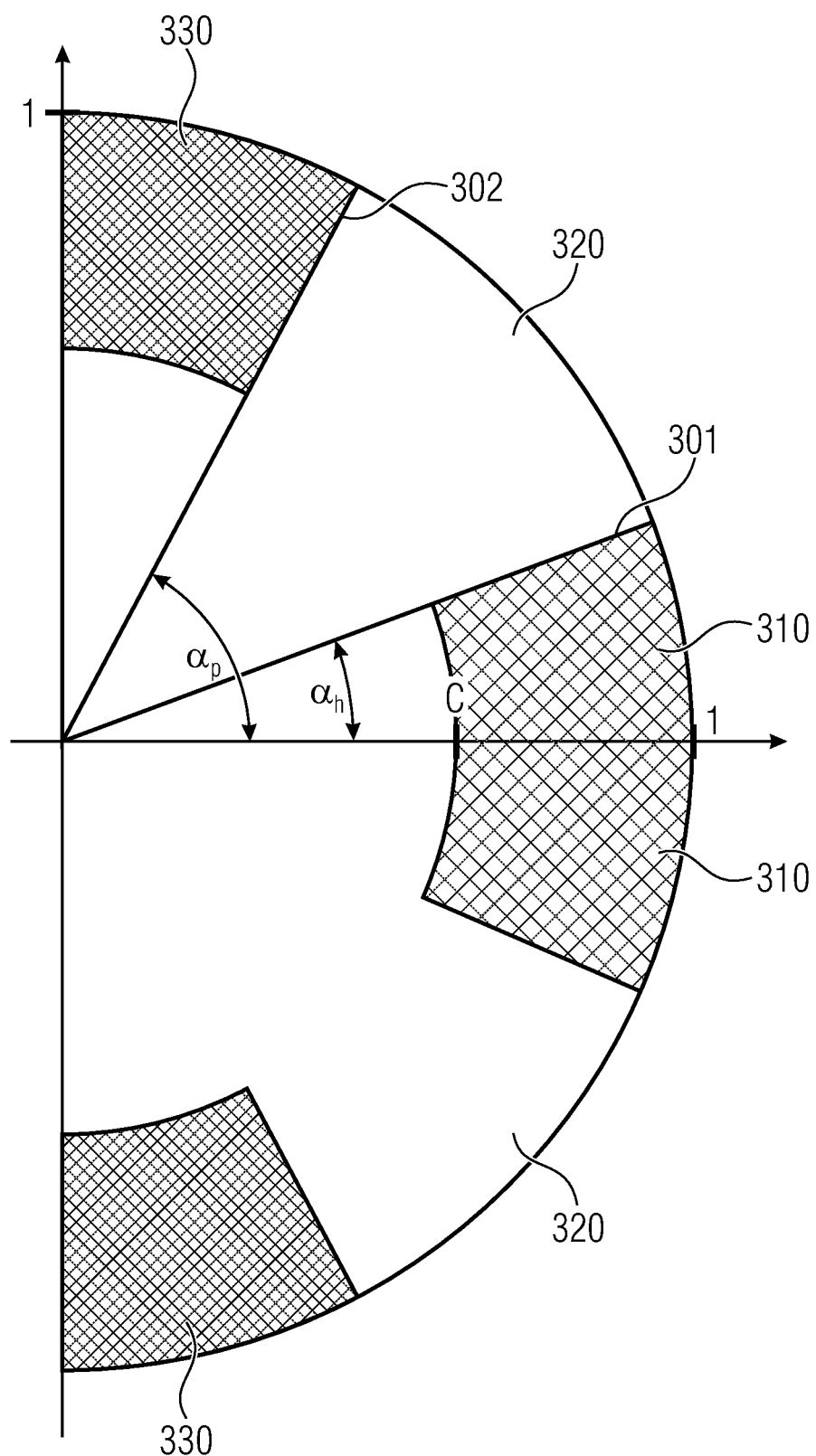
FIG. 3 illustrates a range of orientation/anisotropy values computed by using the structure tensor according to an embodiment.

Similarly, in embodiments, another angle threshold $α_p$ is assigned to define when a bin should be assigned to the percussive component (areas 330 with vertical lines in FIG. 3).

Thus, according to embodiments, a bin (b, k) may, e.g., be assigned to the percussive component, if it satisfies the first of the following two constraints.

According to embodiments, a bin (b, k) may, e.g., be assigned to the percussive component, if it satisfies both of the following two constraints:

The first constraint may, e.g., be that the absolute value of the angle α(b, k) is greater than (or equal to) a threshold value $α_p$. The threshold $α_p$ may, e.g., be in the range $α_p \in [0; π/2]$. This means, that the bin should be part of some spectral structure that does not have a slope bigger or smaller than $α_p$. This way also frequency modulated sounds can be considered to be part of the harmonic component, depending on the parameter $α_p$.

The second constraint may, e.g., be that the measure of anisotropy C(b, k) supports that the bin (b, k) is part of some directed, anisotropic structure, and therefore exceeds a further threshold c. It should be noted that for a given bin (b, k), the angle α(b, k) and the measure of anisotropy C(b, k) together define a point in $\mathbb{R}^2$ given in polar coordinates.

Finally, in embodiments, all bins that are assigned to neither the harmonic nor the percussive component may, e.g., be assigned to the residual component.

The above-described assignment process can be expressed by defining a mask for the harmonic component $M_h$, a mask for the percussive component $M_p$ and a mask for the residual component $M_r$.

It should be noted, that instead of using the threshold value $α_h$ and the threshold value $α_p$ thresholds may in embodiments, e.g., be defined on the maximum absolute frequency change rate $r_h$, $r_p \in \mathbb{R}^{>0}$ with $r_p \geq r_h$ to give the choice of parameters a better physical interpretation. The masks are then given by:

$$M_h(b, k) = \begin{cases} 1 &, |R(b, k)| \leq r_h \wedge C(b, k) > c \\ 0 &, \text{else} \end{cases} \quad (14)$$

$$M_p(b, k) = \begin{cases} 1 &, |R(b, k)| > r_p \wedge C(b, k) > c \\ 0 &, \text{else} \end{cases} \quad (15)$$

$$M_r(b, k) = 1 - M_h(b, k) - M_p(b, k) \quad (16)$$

Finally, the STFT of the harmonic component $X_h$, the percussive component $X_p$ and the residual component X, are obtained by $$X_h = M_h \odot X \quad (17)$$

$$X_p = M_p \odot X \quad (18)$$

$$X_r = M_r \odot X \quad (19)$$

The corresponding time signals can then be calculated via the inverse STFT.

FIG. 3 illustrates a range of orientation/anisotropy values computed by the structure tensor.

In particular, FIG. 3 depicts the subset of all points that lead to an assignment to the harmonic component. In particular, values in the areas 310 with wavy lines lead to an assignment to the harmonic component.

Values in the areas 330 with vertical lines lead to an assignment to the percussive component.

Values in the areas 320 that are dotted lead to an assignment to the residual component.

The threshold $α_h$ defines line 301 in FIG. 3, and the threshold $α_p$ defines line 302 in FIG. 3.

Figure 5:
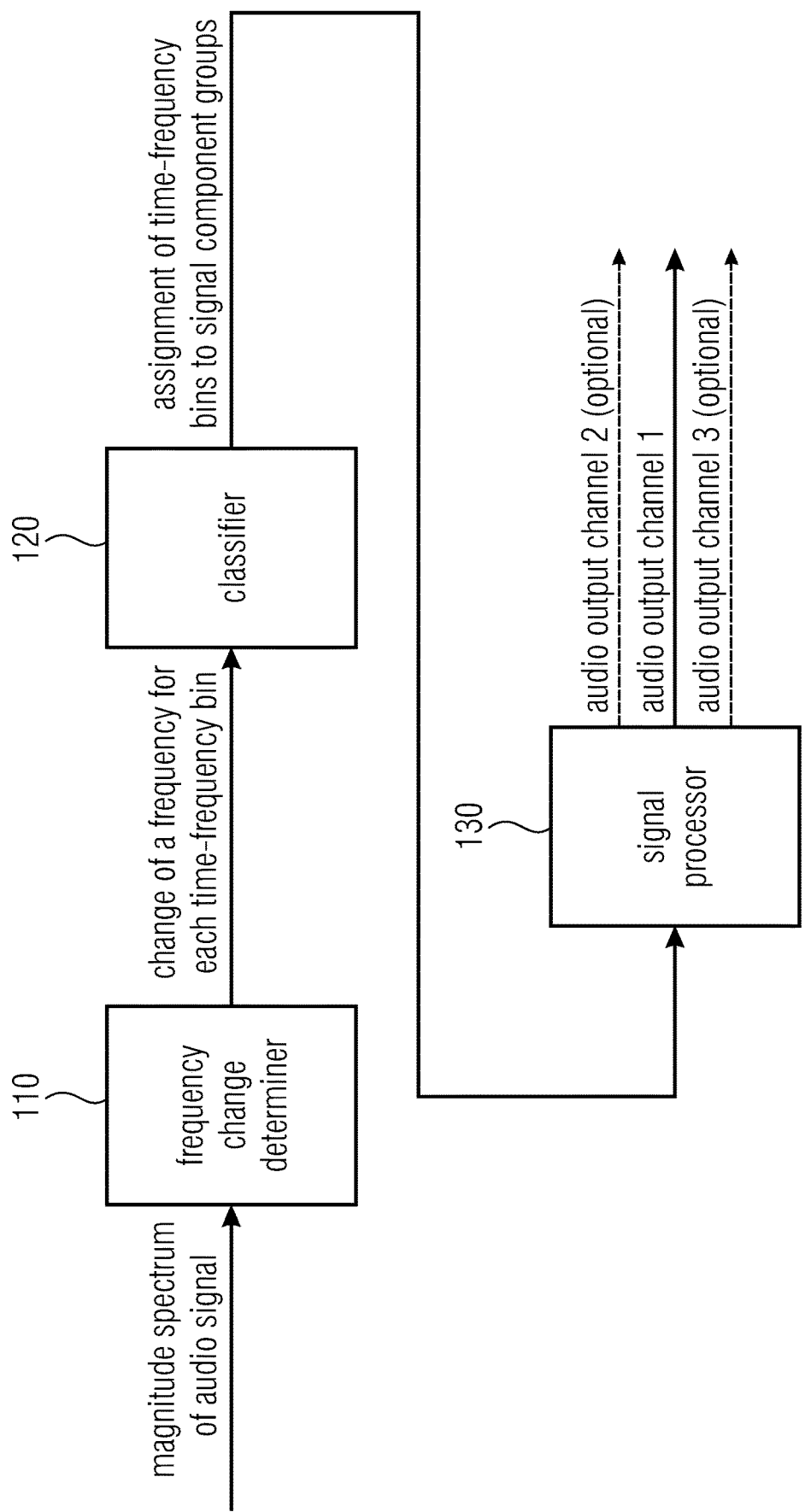
FIG. 5 illustrates an apparatus according to an embodiment, wherein the apparatus comprises a signal generator.

FIG. 5 illustrates an apparatus according to an embodiment, wherein the apparatus comprises a signal generator 130 being configured to generate an audio output signal depending on the assigning of the plurality of time-frequency bins to the two or more signal component groups.

For example, signal generator may filter the different components of the audio signal by applying different weighting factors on the magnitude values of the time-frequency bins of the different signal component groups. For example, the harmonic signal component group may have a first weighting factor $w_h$, the percussive signal component group may have a second weighting factor $w_p$, and the residual signal component group may have a first weighting factor $w_r$, and the magnitude value of each time-frequency bin of the plurality of time-frequency bins may, e.g., be weighted with the weighting factor of the signal component group, the time-frequency bin is assigned to.

For example, to emphasize harmonic signal components, in an embodiment, where the weighting factors are multiplied the with linear magnitude values e.g., $w_h = 1.3, w_p = 0.7$, and $w_r = 0.2$ For example, to emphasize harmonic signal components, in an embodiment, where the weighting factors are added to the logarithmic magnitude values e.g., $w_h = +0.26, w_p = -0.35$, and $w_r = -1.61$ For example, to emphasize percussive signal components, in an embodiment, where the weighting factors are multiplied the with linear magnitude values e.g., $w_h = 0.7, w_p = 1.3$, and $w_r = 0.2$ For example, to emphasize percussive signal components, in an embodiment, where the weighting factors are added to the logarithmic magnitude values e.g., $w_h = -0.35, w_p = +0.26$, and $w_r = -1.61$ Thus, the signal generator 130 is configured to apply a weighting factor on the magnitude value of each time-frequency bin of the plurality of time-frequency bins to obtain the audio output signal, wherein the weighting factor that is applied on said time-frequency bin depends on the signal component group to which said time-frequency bin is assigned.

In a particular embodiment of FIG. 5, the signal processor 130 may, e.g., be an upmixer being configured to upmix the audio signal to obtain the audio output signal comprising two or more audio output channels. The upmixer may, e.g., be configured to generate the two or more audio output channels depending on the assigning of the plurality of time-frequency bins to the two or more signal component groups.

For example, the two or more audio output channels may be generated from the audio signal filter the different components of the audio signal by applying different weighting factors on the magnitude values time-frequency bins of the different signal component groups as described above.

However, to generate the different audio channels different weights for the signal component groups may be used that may, e.g., be specific for each of the different audio output channels.

For example, for a first audio output channel, the weights to be added to the logarithmic magnitude values may, e.g., be $w_{1h}=+0.26, w_{1p}=-0.35$, and $w_{1r}=-1.61$.

And for a second audio output channel, the weights to be added to the logarithmic magnitude values may, e.g., be $w_{2h}=+0.35, w_{2p}=-0.26$, and $w_{2r}=-1.61$.

For example, when upmixing the audio signal to obtain five audio output channels front left, center, right, left surround and right surround:

The harmonic weighting factor $w_{1h}$ may be greater for generating the left, center and right audio output channels compared to the harmonic weighting factor $w_{2h}$ for generating the left surround and right surround audio output channels.

The percussive weighting factor $w_{1p}$ may be smaller for generating the left, center and right audio output channels compared to the percussive weighting factor $w_{2p}$ for generating the left surround and right surround audio output channels.

Individual weighting factors may be used for each audio output channel to be generated.

Figure 6:
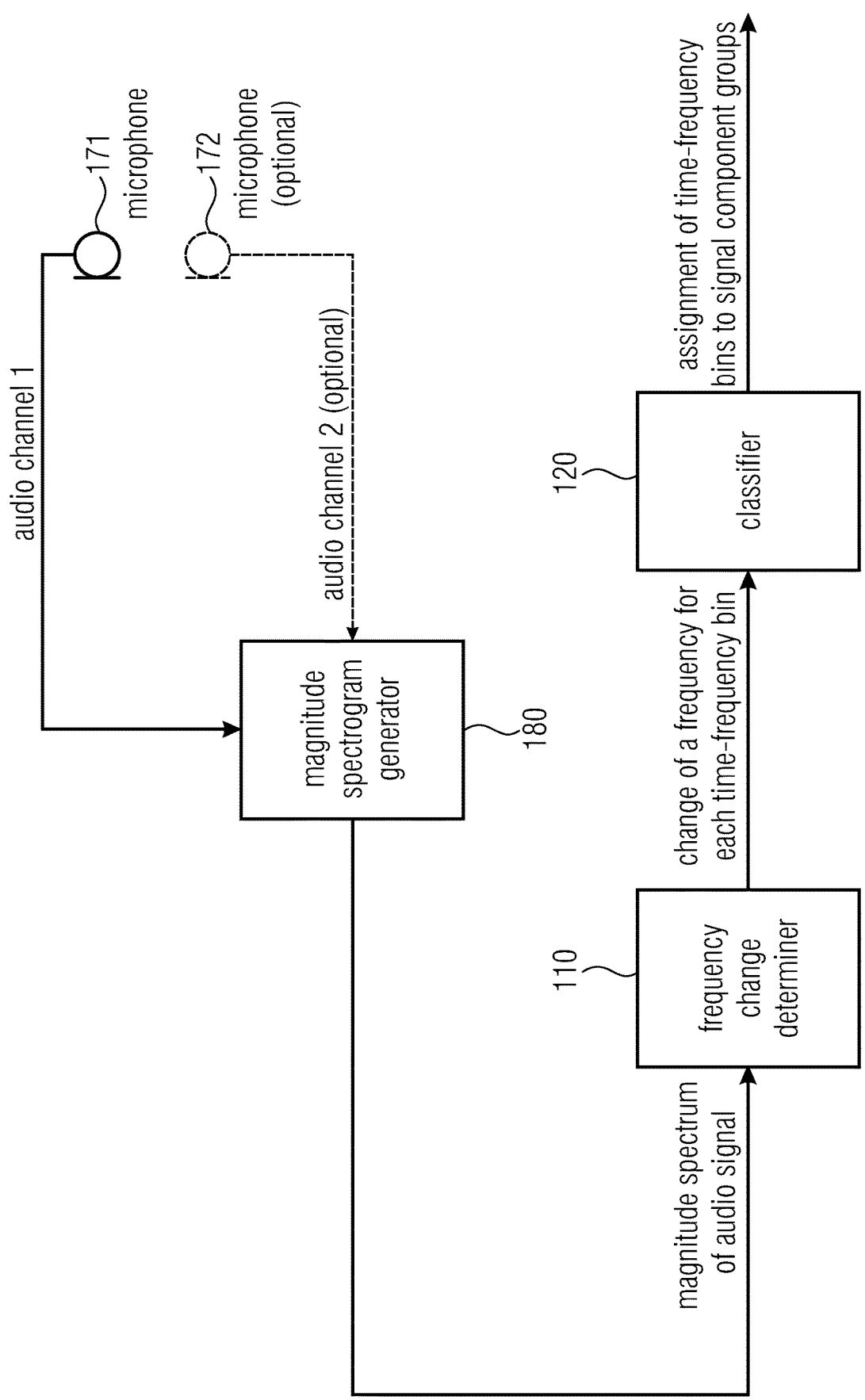
FIG. 6 illustrates an apparatus according to an embodiment, wherein the apparatus comprises one or more microphones for recording the audio signal.

FIG. 6 illustrates an apparatus according to an embodiment, wherein the apparatus comprises one or more microphones 171, 172 for recording the audio signal.

In FIG. 6, the first microphone 171 records a first audio channel of the audio signal. The optional second microphone 172 records an optional second audio channel of the audio signal.

Moreover, the apparatus of FIG. 6 further comprises a magnitude spectrogram generator 180 for generating the magnitude spectrogram of the audio signal from the audio signal which comprises the first audio channel and optionally comprises the optional second audio channel. Generating a magnitude spectrogram from an audio signal is a well-known concept for a person skilled in the art.

In the following, evaluation of embodiments is considered.

To show the effectiveness of embodiments in capturing frequency modulated sounds in the harmonic component, the HPR method based on the structure tensor (HPR-ST) according to embodiments is compared with the non-iterative method based on median filtering presented in [10] (HPR-M). Additionally, the metrics are also computed for the separation results with ideal binary masks (IBM) that served as a reference for the maximal achievable separation quality.

Considering a system-under-test parameters, for both HPR-ST as well as HPR-M, the STFT parameters were chosen to be $f_s=22050$ Hz, N=1024 and H=256, using a sine window for w. The separation parameters for HPR-M were chosen as in the experiments performed in [10]. According to embodiments, the structure tensor is calculated using a differential operator, for example, the Scharr-Operator [17] as discrete differentiation operator d. The smoothing was performed using a 9×9 isotropic Gaussian filter with the standard deviations $\sigma_b=\sigma_k=1.4$ which leads to $\sigma_1 \approx 16$ ms and $\sigma_f \approx 30$ Hz. Finally, the thresholds for the separation were set to e=20, c=0.2 and $r_h=r_p=10000$ Hz/s.

It should be noted that by the choice of $r_h$ and $r_p$ according to embodiments, even very steep structures in the spectrogram are assigned to the harmonic component. Embodiments employ the observations about real world vibrato sounds as for example shown in FIG. 2. Here, you can see that at some instances the vibrato in the singing voice has a very high instantaneous frequency change rate. Furthermore, it should be noted that by choosing $r_h=r_p$, an assignment of a bin in the spectrogram to the residual component is purely dependent on its anisotropy measure.

The effectiveness of HPR-ST according to embodiments was evaluated by comparing it to the state-of-art median filtering based method HPR-M presented in [10] by means of both objective evaluation measures as well as audio examples.

To compare the behavior of HPR-ST according to embodiments and HPR-M of the prior art when applied to signals comprising frequency modulated sounds to obtain objective results, two test items were generated.

Test item 1 consists of the superposition of purely synthetic sounds. The harmonic source was chosen to be a vibrato tone with a fundamental frequency of 1000 Hz, a vibrato frequency of 3 Hz, vibrato extent of 50 Hz and 4 overtones. For the percussive source several impulses are used, while white noise represents the neither harmonic nor percussive residual source.

Test item 2 was generated by superimposing real world signals of singing voice with vibrato (harmonic), castanets (percussive), and applause (neither harmonic nor percussive).

Interpreting the HPR separation of these items as a source separation problem, standard source separation evaluation metrics have been computed (source to distortion ratio SDR, source to interference ratio SIR, and source to artifacts ratios SAR, as introduced in [18]) for the separation results of both procedures. The results are shown in table 1.

Table 1 depicts objective evaluation measures, where all values are given in dB:

TABLE 1

|  |  | SDR | | | SIR | | | SAR | | |
|---|---|---|---|---|---|---|---|---|---|---|
|  |  | IBM | HPR-M | HPR-ST | IBM | HPR-M | HPR-ST | IBM | HPR-M | HPR-ST |
| Item 1 | Vibrato | 29.43 | 11.51 | 21.25 | 34.26 | 27.94 | 30.01 | 31.16 | 11.61 | 21.88 |
|  | Impulses | 8.56 | −10.33 | −1.47 | 20.31 | −7.96 | 12.03 | 8.90 | 2.02 | −1.00 |
|  | Noise | 8.49 | −13.53 | 2.58 | 24.70 | −11.99 | 14.12 | 8.61 | 3.97 | 3.06 |
| Item 2 | Vocals | 14.82 | 6.48 | 9.18 | 22.75 | 20.83 | 15.61 | 15.60 | 6.68 | 10.42 |
|  | Castanets | 8.48 | 3.79 | 2.37 | 21.59 | 16.09 | 17.96 | 8.73 | 4.16 | 2.56 |
|  | Applause | 7.39 | −2.03 | −0.37 | 20.31 | 1.11 | 6.34 | 7.66 | 3.33 | 1.58 |

For item 1 HPR-ST yields a SDR of 21.25 dB for the vibrato tone, and is therefore closer to the optimal separation result of IBM (29.43 dB) than to the separation result of HPR-M (11.51 dB). This indicates that HPR-ST improves on capturing this frequency modulated sound in the harmonic component in comparison to HPRM. This is also shown in FIG. 4.

Figure 4:
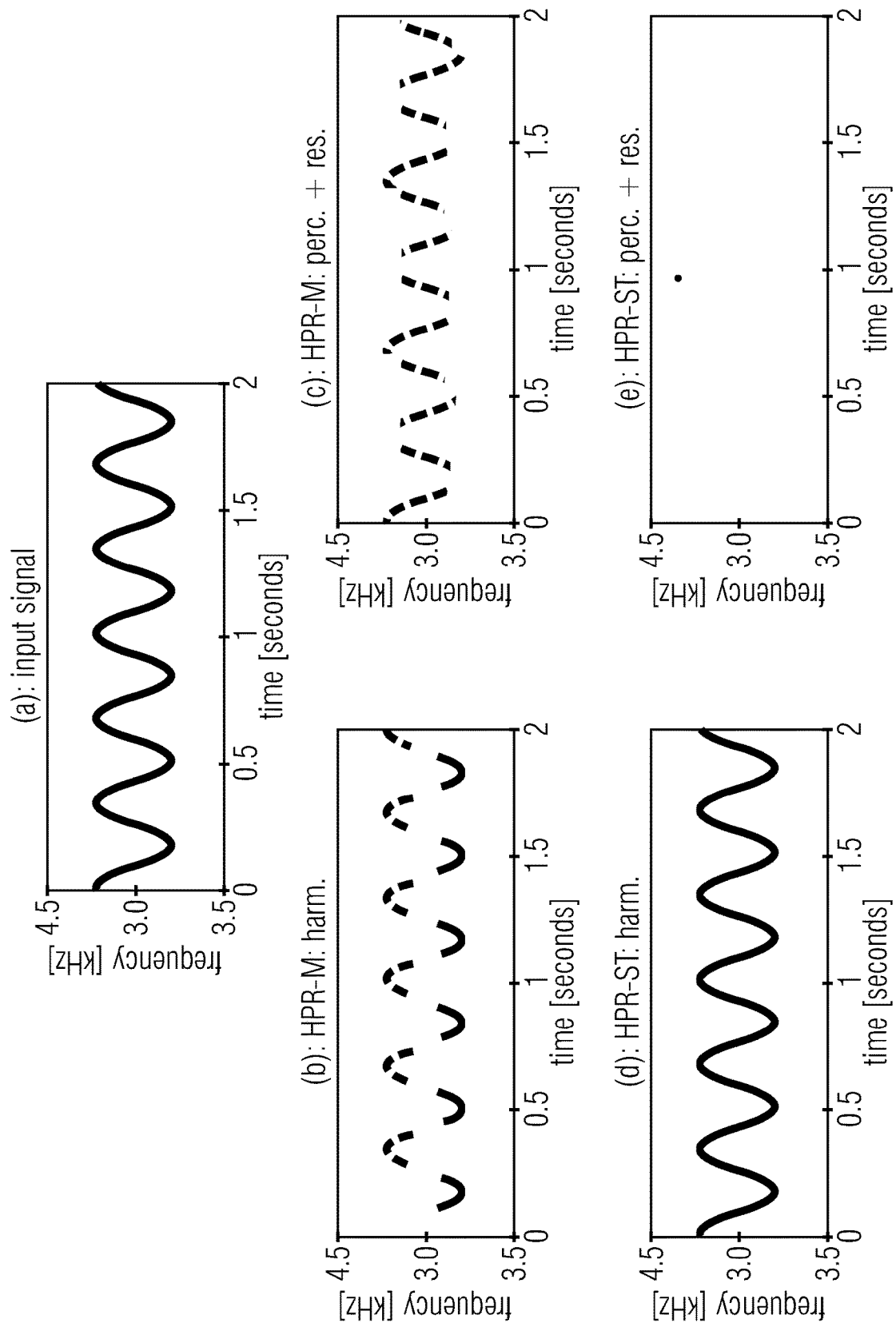
FIG. 4 illustrates a comparison between the HPR-M and HPR-ST method for an excerpt of a synthetic input signal.

FIG. 4 illustrates a comparison between the HPR-M and HPR-ST method for an excerpt of the synthetic input signal (item 1). For enhanced visibility the spectrograms were calculated with different STFT parameters than used for the separation algorithms.

FIG. 4 (*a*) illustrates the frequency of the input signal with respect to time. In FIG. 4, the spectrograms of the harmonic components and the sum of the percussive and residual component computed for both procedures are plotted. It can be seen that for HPR-M the steep slopes of the vibrato tone leaked into the residual component (FIGS. 4 (*b*) and (*c*)), while HPR-ST (FIGS. 4 (*d*) and (*e*)) yields a good separation. This also explains the very low SIR values of HPRM for the residual component compared to HPR-ST (−11.99 dB vs. 14.12 dB).

It should be noted that the high SIR value of HPR-M for the harmonic component only reflects that there are little interfering sounds from the other components, not that the sound of the vibrato is well captured as a whole. In general most of the observations for item 1 are less pronounced, but also valid for the mixture of real world sounds in item 2. For this item, the SIR value of HPR-M for the vocals even exceeds the SIR value of HPR-ST (20.83 dB vs. 15.61 dB). Again, the low SIR value for the applause supports that portions of the vibrato in the vocals leaked into the residual component for HPR-M (1.11 dB) while the residual component of HPR-ST comprises less interfering sounds (6.34 dB). This indicates that embodiments were capable of capturing the frequency modulated structures of the vocals much better than HPR-M.

Summarizing the results, for signals that comprise frequency modulated tones, the HPR-ST concept of embodiments provides much better separation results compared to HPR-M.

Some embodiments employ the structure tensor for singing voice detection. (Singing voice detection according to the prior art is described in [2]).

In the following, another aspect of embodiments is described. This further aspect relates to phase reconstruction from a magnitude spectrogram.

Figure 7:
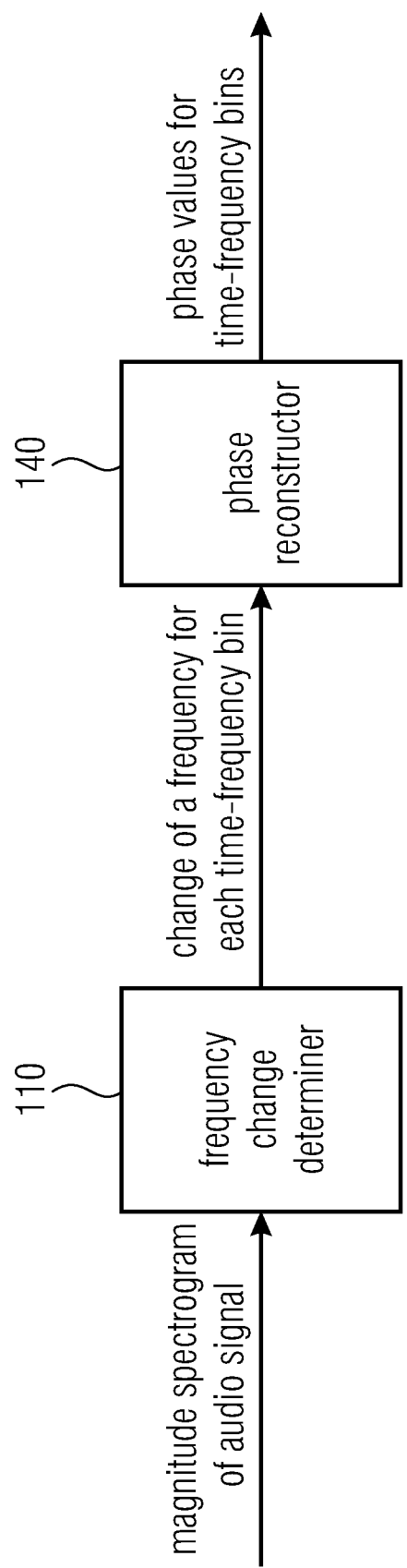
FIG. 7 illustrates an apparatus for phase reconstruction according to an embodiment.

FIG. 7 illustrates an apparatus for phase reconstruction from a magnitude spectrogram of an audio signal according to an embodiment.

The apparatus comprises a frequency change determiner 110 being configured to determine a change of a frequency for each time-frequency bin of a plurality of time-frequency bins of the magnitude spectrogram of the audio signal depending on the magnitude spectrogram of the audio signal.

Moreover, the apparatus comprises a phase reconstructor 140 being configured to generate phase values for the plurality of time-frequency bins depending on the changes of the frequencies determined for the plurality of the time-frequency bins.

According to embodiments, the phase reconstructor 140 may, e.g., be configured to generate the phase value for each time-frequency bin of the plurality of time-frequency bins by integrating the changes of the frequency two times (by integrating two times temporally). In other words, in embodiments, the phase reconstructor 140 is configured to generate the phase value for each time-frequency bin of the plurality of time-frequency bins by integrating two times over time. So, in other words, the interval(s) over which integration is/are performed twice extend/s along the time axis of the spectrogram.

According to other embodiments, the phase reconstructor 140 is configured to generate the phase value for each time-frequency bin of the plurality of time-frequency bins by integrating two times over frequency (by integrating two times spectrally). So, in other words, the interval(s) over which integration is/are performed twice extend/s along the frequency axis of the spectrogram. For example, the integration over frequency that is conducted twice may, e.g., be conducted based on formulae (30) and (31).

In embodiments, the phase reconstructor 140 may, e.g., be configured to generate phase values for the plurality of time-frequency bins depending on the formula $$\phi(bH) = \phi(b_0 H) + \sum_{n=b_0}^{b} \left( \phi_b(b_0) + \sum_{m=b_0}^{b} \phi_{bb}(m) \right)$$

$b_0$ may, e.g., be an index indicating an analysis block of a plurality of blocks. b may, e.g., be a further index indicating a further analysis block of the plurality of blocks. H may, e.g., indicate a hop size. $\phi(bH)$ and $\phi_b(b_0)$ and $\phi_{bb}(m)$ may, e.g., indicate phase values.

In embodiments, the frequency change determiner 110 may, e.g., be configured to determine the change of the frequency for each time-frequency bin of the plurality of time-frequency bins depending on an angle $\alpha(b, k)$ for said time-frequency bin, wherein the angle $\alpha(b, k)$ for said time-frequency bin depends on the magnitude spectrogram of the audio signal.

According to embodiments, the frequency change determiner 110 may, e.g., be configured to determine the change of the frequency for each time-frequency bin of the plurality of time-frequency bins further depending on a sampling frequency $f_s$ of the audio signal, and depending on a length N of an analysis window and depending on a hop size H of the analysis window.

In embodiments, the apparatus frequency change determiner 110 may, e.g., be configured to determine the change of the frequency for each time-frequency bin of the plurality of time-frequency bins depending on the formula $$R(b, k) = \frac{f_s^2}{HN} \cdot \tan(\alpha(b, k))$$

(b, k) indicates a time-frequency bin of the plurality of time-frequency bins, R(b, k) indicates the change of the frequency for said time-frequency bin (b, k), b indicates time, k indicates frequency, $f_s$ indicates the sampling frequency of the audio signal, N indicates the length of the analysis window, H indicates the hop size of the analysis window, and α(b, k) indicates the angle for said time-frequency bin (b, k), wherein the angle α(b, k) depends on the magnitude spectrogram.

According to embodiments, the frequency change determiner 110 may, e.g., be configured to determine a partial derivative $S_b$ of the magnitude spectrogram S of the audio signal with respect to a time index. Moreover, the frequency change determiner 110 may, e.g., be configured to determine a partial derivative $S_k$ of the magnitude spectrogram S of the audio signal with respect to a time index. Furthermore, the frequency change determiner 110 may, e.g., be configured to determine a structure tensor T(b, k) for each time-frequency bin (b, k) of the plurality of time-frequency bins depending on the partial derivative $S_b$ of the magnitude spectrogram S of the audio signal with respect to the time index and depending on the partial derivative $S_k$ of the magnitude spectrogram S of the audio signal with respect to the frequency index. Moreover, the frequency change determiner 110 may, e.g., be configured to determine the angle α(b, k) for each time-frequency bin (b, k) of the plurality of time-frequency bins depending the structure tensor T(b, k) for said time-frequency bin (b, k).

In embodiments, the frequency change determiner 110 may, e.g., be configured to determine the angle α(b, k) for each time-frequency bin (b, k) of the plurality of time-frequency bins by determining two components of $v_1(b, k)$ and $v_2(b, k)$ an eigenvector v(b, k) of the structure tensor T(b, k) of said time-frequency bin (b, k), and by determining the angle α(b, k) for said time-frequency bin (b, k) according to $$\alpha(b, k) = \operatorname{atan}\left(\frac{v_2(b, k)}{v_1(b, k)}\right) \in [-\pi/2; \pi/2]$$

α(b, k) indicates the angle for said time-frequency bin (b, k); b indicates time, k indicates frequency, and atan( ) indicates an inverse tangent function.

According to embodiments, the phase reconstructor 140 being configured to generate phase values for each time-frequency bin of the plurality of time-frequency bins depending on the changes of the frequencies determined for the plurality of the time-frequency bin In embodiments, the phase reconstructor 140 may, e.g., be configured to determine a measure of anisotropy for each time-frequency bin (b, k) of the plurality of time-frequency bins depending on the change of the frequency determined for each time-frequency bin of a plurality of time-frequency bins.

According to embodiments, the phase reconstructor 140 may, e.g., be configured to determine the measure of anisotropy for each time-frequency bin (b, k) of the plurality of time-frequency bins depending on at least one of the formulae:

$$\left(\frac{\mu(b, k) - \lambda(b, k)}{\mu(b, k) + \lambda(b, k)}\right)^2$$

and $$\mu(b, k) + \lambda(b, k) \geq e,$$

μ(b, k) is a first eigenvalue λ(b, k) is a second eigenvalue of the structure tensor (T(b, k)) of said time-frequency bin (b, k), and $e \in \mathbb{R}^{>0}$. The phase reconstructor 140 may, e.g., be configured to assign each time-frequency bin of the plurality of time-frequency bins to a signal component group of two or more signal component groups further depending on the change of the measure of anisotropy.

In embodiments, the phase reconstructor 140 is configured to determine the measure of anisotropy for said time-frequency bin (b, k) depending on the formula:

$$C(b, k) = \begin{cases} \left(\frac{\mu(b, k) - \lambda(b, k)}{\mu(b, k) + \lambda(b, k)}\right)^2 & , \mu(b, k) + \lambda(b, k) \geq e \\ 0 & , \text{else} \end{cases}$$

C(b, k) is the measure of anisotropy depending for said time-frequency bin (b, k). The phase reconstructor 140 may, e.g., be configured to assign said time-frequency bin (b, k) to a residual component group of the two or more signal component groups, if the measure of anisotropy C(b, k) is smaller than an upper threshold value c, or wherein the phase reconstructor 140 may, e.g., be configured to assign said time-frequency bin (b, k) to the residual component group of the two or more signal component groups, if the measure of anisotropy C(b, k) is smaller than or equal to the upper threshold value c. $c \in \mathbb{R}^{>0}$.

According to embodiments, the phase reconstructor 140 may, e.g., be configured to determine a phase reconstruction mode for each time-frequency bin of the plurality of time-frequency bins depending on the measure of anisotropy, whether phase reconstruction shall be conducted, The phase reconstructor 140 may, e.g., be configured to generate the phase value for each time-frequency bin of the plurality of time-frequency bins by integrating the changes of the frequency two times, if the phase reconstruction mode determined by the phase reconstructor 140 for said time-frequency bin indicates a first mode. Moreover, the phase reconstructor 140 may, e.g., be configured to determine a phase for each time-frequency bin of the plurality of time-frequency bins by integrating the changes of the frequency two times, if the phase reconstruction mode determined by the phase reconstructor 140 for said time-frequency bin indicates a second mode, being different from the first mode.

In embodiments, the phase reconstructor 140 may, e.g., be configured to determine the phase reconstruction mode for each time-frequency bin (b, k) of the plurality of time-frequency bins so that the phase reconstruction mode indicates the first mode, if the measure of anisotropy is greater than a lower threshold value c, and so that the phase reconstruction mode indicates the second mode, if the measure of anisotropy for said time-frequency bin (b, k) is smaller than or equal to the lower threshold value c.

In embodiments, the upper threshold value and the lower threshold value c may, e.g., be equal.

Or, the phase reconstructor (140) is configured to determine the phase reconstruction mode for each time-frequency bin (b, k) of the plurality of time-frequency bins so that the phase reconstruction mode indicates the first mode, if the measure of anisotropy for said time-frequency bin (b, k) is greater than or equal to the threshold value c, and so that the phase reconstruction mode indicates the second mode, if the measure of anisotropy is smaller than the threshold value c.

The first mode may, for example, indicate that the time-frequency bin belongs to the harmonic or percussive signal component group.

The first mode may, for example, indicate that the time-frequency bin belongs to the residual signal component group.

In the following, phase estimation according to particular embodiments is described in more detail.

Algorithms for the task of estimating the phase information from a given magnitude spectrogram have been proposed in [19] and [20]. However these algorithms either have high computational complexity or lead to unsatisfactory perceptible quality for general audio signals.

Estimating the phase information from a magnitude spectrogram is a task, that could be used for example in audio coding, where the encoder could transmit only the magnitude while the phase is restored at the decoder. In comparison to state-of-the-art MDCT based coders, where the spectrum show fluctuations over time even for constant tonal signals, a magnitude spectrum (e.g. of the DFT, or CMDCT aka. MCLT) is much more stable which allows for bit rate efficient differential coding over time (see [21]) and effective multi-channel redundancy reduction.

In embodiments, based on the local frequency change estimation by the structure tensor a novel algorithm according to embodiments is based on a signal model considering an arbitrary input signal to be composed of several linear chirps. A linear chirp signal is given by $$x(t)=\sin(\phi(t)), \phi(t)=2\pi f_0 t+\pi R t^2 \tag{20}$$

where t is the time variable, $f_0$ [Hz] is the constant starting frequency and R [Hz/s] is the constant frequency change rate. By deriving the phase argument $\phi(t)$ two times with respect to t it can be shown that $$\frac{d^2}{dt^2}\phi(t) = 2\pi R. \tag{21}$$

Thus the current phase can be obtained by integrating the frequency change rate two times. For our algorithm working in the discrete domain this integration turns into a summation. With the assumption of each spectrogram bin corresponding to a local linear chirp signal, the local frequency change estimated by the structure tensor then corresponds to R for each local chirp. Furthermore using the anisotropy measure obtained via the structure tensor it is possible to perform the needed integration of the local frequency change rates without any explicit signal model or prior semantic classification.

As a high anisotropy measure corresponds do directed structures like tonal or percussive components in the spectrogram, it consequently corresponds to regions where it is possible to reconstruct a phase in contrast to isotrope, noisy regions, where random phase can be assumed.

This is now described in more detail:

As has been described above, the angles (for example, indicated by the direction of the arrows in FIG. 2) obtained by the structure tensor can be translated into a local frequency change rate $$R(b, k) = \frac{f_s^2}{HN} \cdot \tan(\alpha(b, k)) = \frac{\Delta f}{\Delta t}(b, k)[\text{Hz/s}] \tag{22}$$

for each time-frequency-bin of the spectrogram, where $\alpha$(b, k) are the angles for each bin extracted via the structure tensor.

In the following, concepts for using information, for example, of the structure tensor, for phase reconstruction from a magnitude spectrogram and its use for audio coding is explained. It is assumed $$X(b,k)=|X(b,k)|\cdot\exp(i\cdot\varphi(b,k)) \tag{23}$$

to be not only an STFT but also arbitrary time-frequency representation of x(t). The problem of phase reconstruction can then be described as the task to extract an estimate $\hat{\varphi}$(b, k)≈$\varphi$(b, k) out of the magnitude spectrogram |X(b, k)|. Via an inverse transform of $$Y(b,k)=|X(b,k)|\cdot\exp(i\cdot\hat{\varphi}(b,k)) \tag{24}$$

it is then possible to generate the corresponding time domain signal y(t) again.

In embodiments, based on the local frequency change estimation by the structure tensor an novel algorithm for phase reconstruction from a magnitude spectrogram is provided. The principal idea can be understood by considering a discrete linear chirp signal given by $$x(t) = \sin(\phi(t)), \phi(t) = 2\pi\frac{f_0}{f_s}t+\pi R_0\left(\frac{t}{f_s}\right)^2 + \phi_0 \tag{25}$$

where t∈$\mathbb{Z}$ is the time index variable, $f_0$ [Hz] is the constant starting frequency, $R_0$ [Hz/s] is the constant frequency change rate and $\phi_0$ the initial phase. If this signal is analyzed by using an overlapping block transform e.g. the STFT as a filter bank respectively time-frequency representation, the phase propagation because of the window hop size H from the previous analysis block b−1 to the current block b can be expressed by $$\phi_b(b) = \phi(bH) - \phi((b-1)H) = 2\pi\frac{f_0}{f_s}H + \frac{\pi R_0}{f_s^2}(2bH^2 + H^2) \tag{26}$$

Thus $\phi_b$(b) is the finite difference with respect to analysis block index b and can be interpreted as an estimate for the instantaneous angular frequency of x(t). By using $\phi_b$(b) one can express $\phi$(bH) at any analysis block b>$b_0$ when $\phi_b(b_0)$ is known $$\phi(bH) = \phi_b(b_0) + \sum_{n=b_0}^{b} \phi_b(n) \tag{27}$$

Now, the change of $\phi_b(b)$ from the previous analysis block b−1 to the current block b is considered:

$$\phi_{bb}(b) = \phi_b(b) - \phi_b(b-1) = \frac{2\pi H}{f_s^2} R_0 \qquad (28)$$

$\phi_{bb}(b)$ is constant for the linear chirp and comprises the fixed constants as well as the frequency change rate $R_0$. It can be interpreted as the angular frequency increase from one analysis block to the next block. If $\phi_b(b_0)$ is known, formula (27) can be expressed even further using $\phi_{bb}(b)$ $$\phi(bH) = \phi(b_0 H) + \sum_{n=b_0}^{b}\left(\phi_b(b_0) + \sum_{m=b_0}^{n} \phi_{bb}(m)\right) \qquad (29)$$

This means that we can calculate the phase $\phi(bH)$ at analysis block b if we know the phase and the instantaneous frequency at a previous analysis block and further the constant frequency change $R_0$.

Note that the dual of these expressions and formulas can be calculated for transient signals e.g. impulses. However there the finite difference has to be done with respect to frequency index k in the spectral phase $\psi(k)=\arg(X(b, k))$ of a certain analysis block b.

The temporal center of gravity for a transient signal is then obtained by $$\psi_k(k) = \psi(k) - \psi(k-1) \qquad (30)$$

and the change of temporal center of gravity for transient signal over frequency index k by $$\psi_{kk}(k) = \psi_k(k) - \psi_k(k-1) \qquad (31)$$

The dual expressions for formula (27) and formula (29) can be deduced for this case.

According to embodiments, an algorithm for phase reconstruction from a magnitude spectrum is provided as explained above using the estimate of the local frequency change rate obtained by the structure tensor.

With the assumption of each spectrogram bin corresponding to a local linear chirp signal respectively having a linear frequency change, the local frequency change R(b, k) estimated by the structure tensor then corresponds to the chirp rate or local linear frequency change $R_0$ as explained in the previous subsection. This means that the predominant directions obtained by the structure tensor can be seen as a smoothed, robust estimate for the second derivative of $\phi_{bb}(b)$ with respect to the time index b and up to some multiplicative constants.

Using this estimate, the formula (29) can then be used to calculate the current phase of the signal. As a linear frequency change is only assumed in the scope of one bin even for signals with more complex frequency modulation a phase estimate can be obtained. It has to be noted that the instantaneous frequency as well as the initial phase have either to be known beforehand (e.g. transmitted as side information) or estimated with different methods. Especially the instantaneous frequency can be estimated using interpolation like QFFT or derivates of the magnitude spectrum.

It has to be noted that even though formula (29) shows sums strictly summing into analysis block direction b, in a more advanced algorithm the sum has to follow the trajectory of the signals main lobe in the spectrogram. Thus it might be needed to incorporate the directional information respectively local frequency change rate obtained via the structure tensor either implicitly or explicitly in the direction of summation. This could lead to the estimated phase being a superposition of the result of sums in frequency index k direction and analysis block index b direction.

Further it has to be noted, that the expression calculated via formula (29) corresponds to the argument of the sine as shown in formula (25). Even though this has a strong correspondence to the phase observed in the spectral representation, it might be needed to use further knowledge (e.g. an analytic expression of the spectrum in dependence of the phase) to synthesize the phase for each bin (e.g. for the side lobes of the spectrum) correctly.

Furthermore using the anisotropy measure obtained via the structure tensor it is possible to perform the needed integration of the local frequency change rates without any explicit signal model or prior semantic classification. As a high anisotropy measure corresponds do directed structures like tonal or percussive components in the spectrogram, it consequently corresponds to regions where it is possible to reconstruct a phase in contrast to isotrope, noisy regions, where random phase can be assumed.

Furthermore it is not necessary to restrict the algorithm to monotimbral signals.

Embodiments achieve advantages over the prior art. For example, some embodiments exhibit moderate computational complexity (e.g., less than in [19]). Moreover, some embodiments, better phase estimation than in [20] for frequency modulated signals.

Some embodiments realize inherent classification of signal components:

For example, according to some embodiments, phase estimation is possible for harmonic signal components; phase estimation is possible for percussive signal components; but phase estimation is not possible for residual signal components and/or noisy signal components.

In the following, audio coding applications are considered.

The choice of filter bank is a critical step in designing an audio codec. State-of-the-art codecs often use the MDCT (Modified-Discrete-Cosine-Transform), as it offers 50% overlap while being critically sampled and perfect reconstructing in absence of quantization. In coding applications these properties reduce blocking artifacts while keeping the amount of data for spectral coefficients that have to be transmitted low. A downside of the MDCT is its spectral fluctuation over time even for stationary signals. This leads to a loss of coding gain for e.g. differential coding of spectral coefficients, as information of previously transmitted MDCT spectrum have only limited use in the reconstruction of the current MDCT spectrum.

As the magnitude of a spectrum, e.g. the magnitude of a 50% overlapping MCLT (Modulated-Complex-Lapped-Transform) filter bank, is much more stable over time [21] especially for stationary signals, embodiments provide a design of a codec based on the above concepts for phase reconstruction.

According to embodiments, the encoder performs a time-frequency decomposition of the PCM input signal x(t) using the analysis filter bank to obtain the complex spectrum X(f) for a certain time interval e.g. one frame. X(f) is used to extract side info.

In embodiments, the side info may, e.g., comprise a fundamental frequency and/or a time position of transient signals and/or initialization phases (e.g. in regular intervals) and/or information about the current signal class, etc.

Then the magnitude of X(j) is quantized to |Y(f)| and transmitted to the decoder together with the side info. The decoder then uses the side information as well as the quantized magnitude spectrum |Y(f)| to estimate the phase of the original complex spectrum X(f) as described above. Using the this estimated phase a complex spectrum Y(f) can be obtained, which should resemble X(f) closely. Y(f) is then fed into the synthesis filter bank to obtain the time domain output signal y(t). With the proposed MCLT filter bank a codec like this would still show the desirable features like overlap and critical sampling, while offering more efficient possibilities for differential coding of stationary signals.

Figure 8:
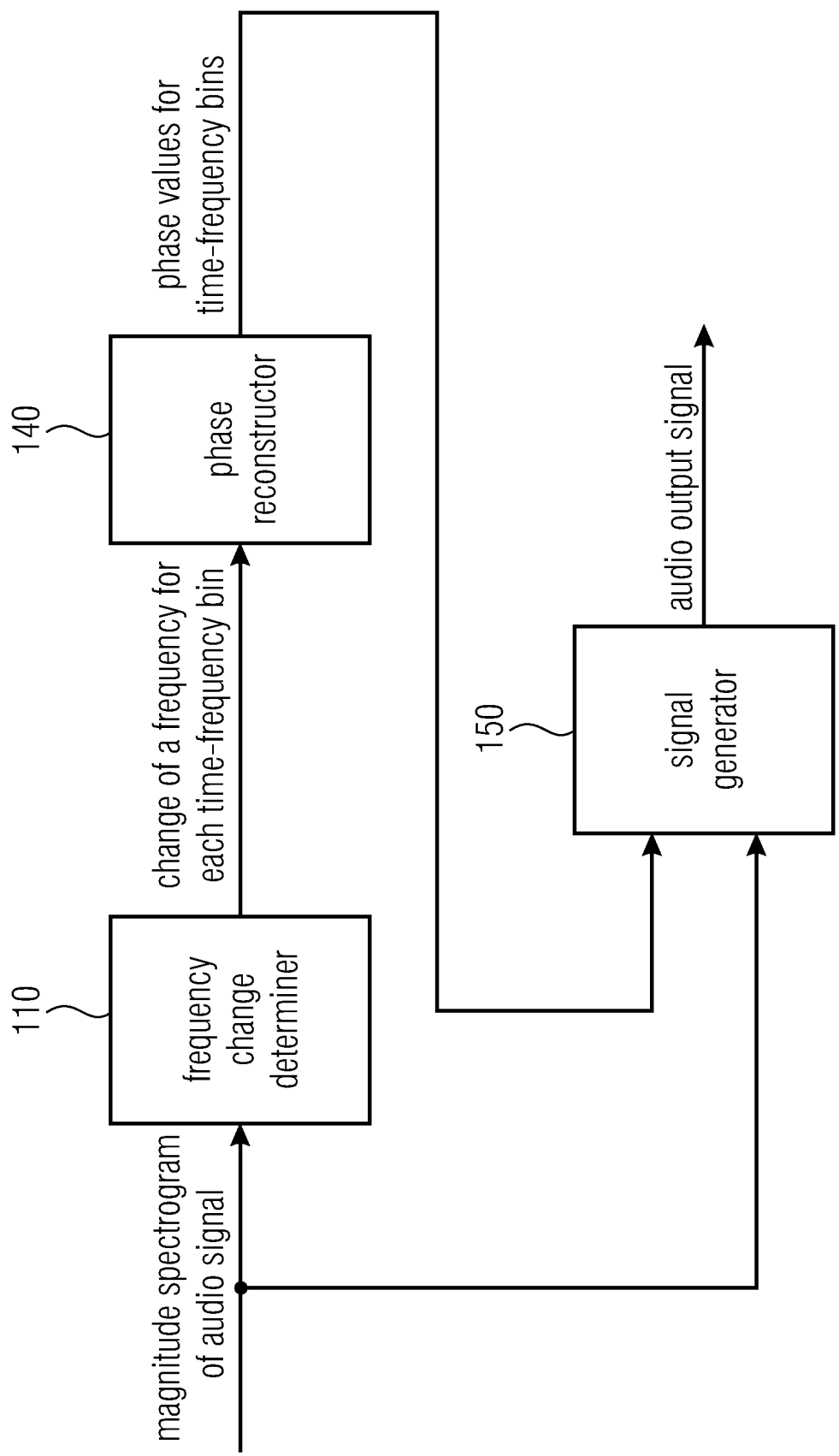
FIG. 8 illustrates an apparatus for phase reconstruction according to an embodiment comprising a signal generator.

FIG. 8 illustrates an apparatus for phase reconstruction according to one of the above-described embodiments comprising a signal generator 150. The signal generator 150 is configured to generate an audio output signal depending on the magnitude spectrogram of the audio signal and depending on the phase values for the plurality of time-frequency bins.

For example, the magnitude spectrogram provides the magnitude value for a particular time-frequency bin and the phase value for the particular time-frequency bin has been reconstructed by the phase reconstructor 140.

Figure 9:
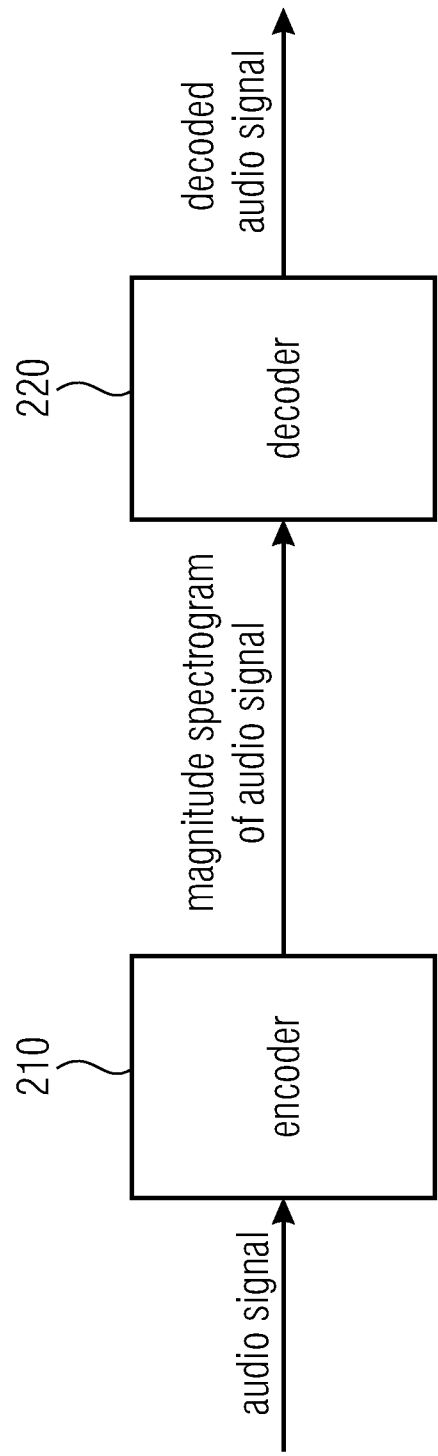
FIG. 9 illustrates a system comprising an encoder and a decoder according to an embodiment, wherein the decoder is an apparatus for phase reconstruction according to an embodiment.

FIG. 9 illustrates a system comprising an encoder 210 and a decoder 220 according to an embodiment, wherein the decoder 220 is an apparatus for phase reconstruction according to one of the above-described embodiments.

The encoder 210 is configured to encode a magnitude spectrogram of an audio signal.

The decoder 220 is configured to determine a change of a frequency for each time-frequency bin of a plurality of time-frequency bins of the magnitude spectrogram of the audio signal depending on the magnitude spectrogram of the audio signal.

Moreover, the decoder 220 is configured to generate phase values for the plurality of time-frequency bins depending on the changes of the frequencies determined for the plurality of the time-frequency bins.

Furthermore, the decoder 220 is configured to decode the audio signal using the magnitude spectrogram of the audio signal and using the phase values for the plurality of time-frequency bins.

Figure 10:
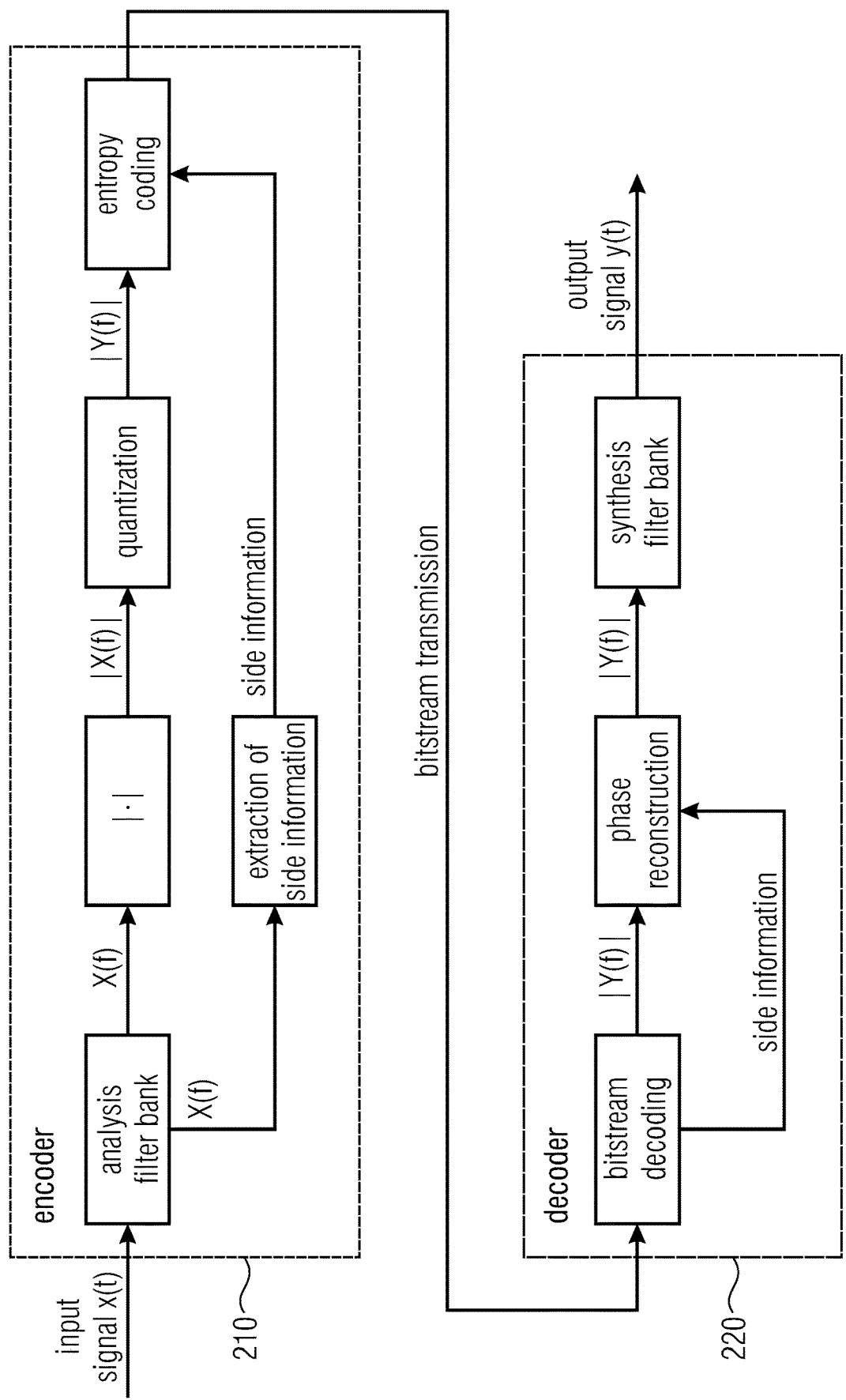
FIG. 10 illustrates an audio encoder and an audio decoder according to embodiments using the magnitude spectrum for transmission.

FIG. 10 illustrates an audio encoder 210 and an audio decoder 220 according to embodiments using the magnitude spectrum for transmission.

The audio encoder 210 is configured to generate a magnitude spectrogram of an audio signal for the apparatus for phase reconstruction as described above. In FIG. 10, the decoder 220 may, e.g., be an apparatus for phase reconstruction as described above.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Aggelos Gkiokas, Vassilios Katsouros, George Carayannis, and Themos Stafylakis, "*Music tempo estimation and beat tracking by applying source separation and metrical relations*", in Proceedings of the IEEE International Conference on Acoustics, Speech, and Signal Processing (ICASSP), 2012, pp. 421-424.

[2] Bernhard Lehner, Gerhard Widmer, and Reinhard Sonnleitner, "*On the reduction of false positives in singing voice detection*", in Proceedings of the IEEE International Conference on Acoustics, Speech, and Signal Processing (ICASSP), Florence, Italy, 2014, pp. 7480-7484.

[3] Yushi Ueda, Yuuki Uchiyama, Takuya Nishimoto, Nobutaka Ono, and Shigeki Sagayama, "*HMM-based approach for automatic chord detection using refined acoustic features*", in Proceedings of the IEEE International Conference on Acoustics, Speech, and Signal Processing (ICASSP), Dallas, Tex., USA, 2010, pp. 5518-5521.

[4] Nobutaka Ono, Kenichi Miyamoto, Hirokazu Kameoka, and Shigeki Sagayama, "*A real-time equalizer of harmonic and percussive components in music signals*", in Proceedings of the International Society for Music Information Retrieval Conference (ISMIR), Philadelphia, Pa., USA, 2008, pp. 139-144.

[5] Nobutaka Ono, Kenichi Miyamoto, Jonathan LeRoux, Hirokazu Kameoka, and Shigeki Sagayama, "*Separation of a monaural audio signal into harmonic/percussive components by complementary diffusion on spectrogram*", in European Signal Processing Conference, Lausanne, Switzerland, 2008, pp. 240-244.

[6] Derry Fitzgerald, "*Harmonic/percussive separation using median filtering*", in Proceedings of the International Conference on Digital Audio Effects (DAFX), Graz, Austria, 2010, pp. 246-253.

[7] Scott N. Levine and Julius O. Smith III, "*A sines+transients+noise audio representation for data compression and time/pitch scale modications*", in Proceedings of the AES Convention, 1998.

[8] Tony S. Verma and Teresa H. Y. Meng, "*An analysis/synthesis tool for transient signals that allows a flexible sines+transients+noise model for audio*", in Proceedings of the IEEE International Conference on Acoustics, Speech, and Signal Processing (ICASSP), Seattle, Wash., USA, May 1998, pp. 3573-3576.

[9] Laurent Daudet, "*Sparse and structured decompositions of signals with the molecular matching pursuit*", IEEE Transactions on Audio, Speech, and Language Processing, vol. 14, no. 5, pp. 1808-1816, September 2006.

[10] Jonathan Driedger, Meinard Müller, and Sascha Disch, "*Extending harmonic-percussive separation of audio signals*", in Proceedings of the International Conference on Music Information Retrieval (ISMIR), Taipei, Taiwan, 2014, pp. 611-616.

[11] Jeongsoo Park and Kyogu Lee, "*Harmonic-percussive source separation using harmonicity and sparsity constraints*", in Proceedings of the International Conference on Music Information Retrieval (ISMIR), Málaga, Spain, 2015, pp. 148-154.

[12] Josef Bigun and Gösta H. Granlund, "*Optimal orientation detection of linear symmetry*", in Proceedings of the IEEE First International Conference on Computer Vision, London, U K, 1987, pp. 433-438.

[13] Hans Knutsson, "*Representing local structure using tensors*", in 6th Scandinavian Conference on Image Analysis, Oulu, Finland, 1989, pp. 244-251.

[14] Chris Harris and Mike Stephens, "*A combined corner and edge detector*", in Proceedings of the 4th Alvey Vision Conference, Manchester, U K, 1988, pp. 147-151.

[15] Rolf Bardeli, "*Similarity search in animal sound databases*", IEEE Transactions on Multimedia, vol. 11, no. 1, pp. 68-76, January 2009.

[16] Matthias Zeppelzauer, Angela S. Stöger, and Christian Breiteneder, "*Acoustic detection of elephant presence in noisy environments*", in Proceedings of the 2nd ACM International Workshop on Multimedia Analysis for Ecological Data, Barcelona, Spain, 2013, pp 4. 3-8.

[17] Hanno Scharr, "*Optimale Operatoren in der digitalen Bildverarbeitung*", Dissertation, IWR, Fakultät for Physik und Astronomie, Universität Heidelberg, Heidelberg, Germany, 2000.

[18] Emmanuel Vincent, Rémi Gribonval, and Cédric Févotte, "*Performance measurement in blind audio source separation*", IEEE Transactions on Audio, Speech, and Language Processing, vol. 14, no. 4, pp. 1462-1469, 2006.

[19] Daniel W. Griffin and Jae S. Lim, "*Signal estimation from modified short-time Fourier transform*", IEEE Transactions on Acoustics, Speech, and Signal Processing, vol. 32, no. 2, pp. 236-243, 1984.

[20] Paul Magron, Roland Badeau, and Bertrand David, "*Phase reconstruction of spectrograms with linear unwrapping: application to audio signal restoration*", in Signal Processing Conference (EUSIPCO), 2015 23rd European. IEEE, 2015, pp. 1-5.

[21] Byung-Jun Yoon and Henrique S Malvar, "*Coding overcomplete representations of audio using the mclt*", in Data Compression Conference, 2008. DCC 2008. IEEE, 2008, pp. 152-161.

The invention claimed is:

1. An apparatus for phase reconstruction from a magnitude spectrogram of an audio signal, comprising:
a frequency change determiner being configured to determine a change of a frequency for each time-frequency bin of a plurality of time-frequency bins of the magnitude spectrogram of the audio signal depending on the magnitude spectrogram of the audio signal, and
a phase reconstructor being configured to generate phase values for the plurality of time-frequency bins depending on the changes of the frequencies determined for the plurality of the time-frequency bins.

2. The apparatus according to claim 1,
wherein the phase reconstructor is configured to generate the phase value for each time-frequency bin of the plurality of time-frequency bins by integrating the changes of the frequency two times.

3. The apparatus according to claim 1,
wherein the phase reconstructor is configured to generate phase values for the plurality of time-frequency bins depending on the formula $$\phi(bH) = \phi(b_0 H) + \sum_{n=b_0}^{b}\left(\phi_b(b_0) + \sum_{m=b_0}^{b}\phi_{bb}(m)\right)$$

wherein $b_0$ is an index indicating an analysis block of a plurality of blocks,
wherein b is a further index indicating a further analysis block of the plurality of blocks,
wherein H indicates a hop size, and
wherein $\phi(bH)$ and $\phi_b(b_0)$ and $\phi_{bb}$ (m) indicate phase values.

4. The apparatus according to claim 1,
wherein the frequency change determiner is configured to determine the change of the frequency for each time-frequency bin of the plurality of time-frequency bins depending on an angle for said time-frequency bin, wherein the angle for said time-frequency bin depends on the magnitude spectrogram of the audio signal.

5. The apparatus according to claim 4,
wherein the frequency change determiner is configured to determine the change of the frequency for each time-frequency bin of the plurality of time-frequency bins further depending on a sampling frequency of the audio signal, and depending on a length of an analysis window and depending on a hop size of the analysis window.

6. The apparatus according to claim 5,
wherein the apparatus frequency change determiner is configured to determine the change of the frequency for each time-frequency bin of the plurality of time-frequency bins depending on the formula $$R(b, k) = \frac{f_s^2}{HN} \cdot \tan(\alpha(b, k))$$

wherein (b, k) indicates a time-frequency bin of the plurality of time-frequency bins,
wherein R(b, k) indicates the change of the frequency for said time-frequency bin,
wherein b indicates time,
wherein k indicates frequency,
wherein $f_s$ indicates the sampling frequency of the audio signal,
wherein N indicates the length of the analysis window,
wherein H indicates the hop size of the analysis window, and
wherein $\alpha(b, k)$ indicates the angle for said time-frequency bin, wherein the angle $\alpha(b, k)$ depends on the magnitude spectrogram.

7. The apparatus according to claim 4,
wherein the frequency change determiner is configured to determine a partial derivative of the magnitude spectrogram of the audio signal with respect to a time index,
wherein the frequency change determiner is configured to determine a partial derivative of the magnitude spectrogram of the audio signal with respect to a time index, and
wherein the frequency change determiner is configured to determine a structure tensor for each time-frequency bin of the plurality of time-frequency bins depending on the partial derivative of the magnitude spectrogram of the audio signal with respect to the time index and depending on the partial derivative of the magnitude spectrogram of the audio signal with respect to the frequency index, and
wherein the frequency change determiner is configured to determine the angle for each time-frequency bin of the plurality of time-frequency bins depending the structure tensor for said time-frequency bin.

8. The apparatus according to claim 7,
wherein the frequency change determiner is configured to determine the angle for each time-frequency bin of the plurality of time-frequency bins by determining two components of and an eigenvector of the structure tensor of said time-frequency bin, and by determining the angle for said time-frequency bin according to $$\alpha(b, k) = \operatorname{atan}\left(\frac{v_2(b, k)}{v_1(b, k)}\right) \in [-\pi/2; \pi/2]$$

wherein $\alpha(b, k)$ indicates the angle for said time-frequency bin,
wherein b indicates time,
wherein k indicates frequency, and
wherein atan( ) indicates an inverse tangent function.

9. The apparatus according to claim 1, wherein the phase reconstructor being configured to generate phase values for each time-frequency bin of the plurality of time-frequency bins depending on the changes of the frequencies determined for the plurality of time-frequency bins.

10. The apparatus according to claim 7, wherein the phase reconstructor is configured to determine a measure of anisotropy for each time-frequency bin of the plurality of time-frequency bins depending on the change of the frequency determined for each time-frequency bin of the plurality of time-frequency bins.

11. The apparatus according to claim 10,
wherein the phase reconstructor is configured to determine the measure of anisotropy for each time-frequency bin of the plurality of time-frequency bins depending on at least one of the formulae:

$$\left(\frac{\mu(b, k) - \lambda(b, k)}{\mu(b, k) + \lambda(b, k)}\right)^2$$

and $$\mu(b, k) + \lambda(b, k) \geq e,$$

wherein $\mu(b, k)$ is a first eigenvalue $\lambda(b, k)$ is a second eigenvalue of the structure tensor of said time-frequency bin, and $e \in \mathbb{R}^{\geq 0}$,
wherein the phase reconstructor is configured to assign each time-frequency bin of the plurality of time-frequency bins to a signal component group of two or more signal component groups further depending on the change of the measure of anisotropy.

12. The apparatus according to claim 11,
wherein the phase reconstructor is configured to determine the measure of anisotropy for said time-frequency bin depending on the formula:

$$C(b, k) = \begin{cases} \left(\frac{\mu(b, k) - \lambda(b, k)}{\mu(b, k) + \lambda(b, k)}\right)^2 & , \mu(b, k) + \lambda(b, k) \geq e \\ 0 & , \text{else} \end{cases}$$

wherein C(b, k) is the measure of anisotropy depending for said time-frequency bin, and wherein the phase reconstructor is configured to assign said time-frequency bin to a residual component group of the two or more signal component groups, if the measure of anisotropy C(b, k) is smaller than an upper threshold value c, or wherein the phase reconstructor is configured to assign said time-frequency bin to the residual component group of the two or more signal component groups, if the measure of anisotropy C(b, k) is smaller than or equal to the upper threshold value c, wherein $c \in \mathbb{R}^{>0}$.

13. The apparatus according to claim 9, wherein the phase reconstructor is configured to determine a phase reconstruction mode for each time-frequency bin of the plurality of time-frequency bins depending on the measure of anisotropy, whether phase reconstruction shall be conducted, wherein the phase reconstructor is configured to generate the phase value for each time-frequency bin of the plurality of time-frequency bins by integrating the changes of the frequency two times, if the phase reconstruction mode determined by the phase reconstructor for said time-frequency bin indicates a first mode, and wherein the phase reconstructor is configured to determine a phase for each time-frequency bin of the plurality of time-frequency bins by integrating the changes of the frequency two times, if the phase reconstruction mode determined by the phase reconstructor for said time-frequency bin indicates a second mode, being different from the first mode.

14. The apparatus according to claim 13, wherein the phase reconstructor is configured to determine the phase reconstruction mode for each time-frequency bin of the plurality of time-frequency bins so that the phase reconstruction mode indicates the first mode, if the measure of anisotropy for said time-frequency bin is greater than a lower threshold value, and so that the phase reconstruction mode indicates the second mode, if the measure of anisotropy for said time-frequency bin is smaller than or equal to the lower threshold value, or wherein the phase reconstructor is configured to determine the phase reconstruction mode for each time-frequency bin of the plurality of time-frequency bins so that the phase reconstruction mode indicates the first mode, if the measure of anisotropy for said time-frequency bin is greater than or equal to the lower threshold value, and so that the phase reconstruction mode indicates the second mode, if the measure of anisotropy for said time-frequency bin is smaller than the lower threshold value.

15. The apparatus according to claim 1, wherein the phase reconstructor is configured to generate the phase value for each time-frequency bin of the plurality of time-frequency bins by integrating two times over frequency.

16. The apparatus according to claim 1, wherein the phase reconstructor is configured to generate the phase value for each time-frequency bin of the plurality of time-frequency bins by integrating two times over time.

17. The apparatus according to claim 1, wherein the apparatus comprises a signal generator being configured to generate an audio output signal depending on the magnitude spectrogram of the audio signal and depending on the phase values for the plurality of time-frequency bins.

18. A system, comprising:

an encoder for encoding a magnitude spectrogram of an audio signal, and a decoder being an apparatus according to one claim 1, for decoding the audio signal, wherein the decoder is configured to determine a change of a frequency for each time-frequency bin of a plurality of time-frequency bins of the magnitude spectrogram of the audio signal depending on the magnitude spectrogram of the audio signal, wherein the decoder is configured to generate phase values for the plurality of time-frequency bins depending on the changes of the frequencies determined for the plurality of the time-frequency bins, and wherein the decoder is configured to decode the audio signal using the magnitude spectrogram of the audio signal and using the phase values for the plurality of time-frequency bins.

19. An encoder being configured to generate a magnitude spectrogram of an audio signal for the apparatus for phase reconstruction according to claim 1.

20. A method for phase reconstruction from a magnitude spectrogram of an audio signal, comprising:

determining a change of a frequency for each time-frequency bin of a plurality of time-frequency bins of the magnitude spectrogram of the audio signal depending on the magnitude spectrogram of the audio signal, and generating phase values for the plurality of time-frequency bins depending on the changes of the frequencies determined for the plurality of the time-frequency bins.

21. A non-transitory digital storage medium having a computer program stored thereon to perform the method for phase reconstruction from a magnitude spectrogram of an audio signal, comprising:

determining a change of a frequency for each time-frequency bin of a plurality of time-frequency bins of the magnitude spectrogram of the audio signal depending on the magnitude spectrogram of the audio signal, and generating phase values for the plurality of time-frequency bins depending on the changes of the frequencies determined for the plurality of the time-frequency bins, when said computer program is run by a computer.

* * * * *

UNITED STATES PATENT AND TRADEMARK OFFICE
CERTIFICATE OF CORRECTION

PATENT NO. : 10,607,630 B2
APPLICATION NO. : 16/133840
DATED : March 31, 2020
INVENTOR(S) : Niedermeier et al.

Page 1 of 1

It is certified that error appears in the above-identified patent and that said Letters Patent is hereby corrected as shown below:

On the Title Page

Item (73), delete "FRAUNHOFER-GESELLSCHAFT ZUR FÖRDERUNG DER" and insert therefor:
-- Fraunhofer-Gesellschaft zur Förderung der angewandten Forschung e.V. --

In the Claims

Column 27, Line 1, replace the equation with the following:

$$\phi(bH) = \phi(b_0 H) + \sum_{n=b_0}^{b} \left( \phi_b(b_0) + \sum_{m=b_0}^{n} \phi_{bb}(m) \right)$$

Signed and Sealed this
Twenty-second Day of December, 2020

Andrei Iancu
*Director of the United States Patent and Trademark Office*